United States Patent
Master et al.

(10) Patent No.: US 9,621,963 B2
(45) Date of Patent: Apr. 11, 2017

(54) ENABLING DELIVERY AND SYNCHRONIZATION OF AUXILIARY CONTENT ASSOCIATED WITH MULTIMEDIA DATA USING ESSENCE-AND-VERSION IDENTIFIER

(71) Applicant: Dolby Laboratories Licensing Corporation, San Francisco, CA (US)

(72) Inventors: Aaron Steven Master, San Francisco, CA (US); Jeffrey Riedmiller, Penngrove, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/606,230

(22) Filed: Jan. 27, 2015

(65) Prior Publication Data

US 2016/0212501 A1 Jul. 21, 2016

Related U.S. Application Data

(60) Provisional application No. 62/080,017, filed on Nov. 14, 2014, provisional application No. 61/932,772, filed on Jan. 28, 2014.

(51) Int. Cl.
*H04N 21/81* (2011.01)
*H04N 21/854* (2011.01)
(Continued)

(52) U.S. Cl.
CPC ....... *H04N 21/8133* (2013.01); *H04N 21/222* (2013.01); *H04N 21/2353* (2013.01);
(Continued)

(58) Field of Classification Search
CPC ........... H04N 21/8133; H04N 21/6581; H04N 21/2353; H04N 21/8586; H04N 21/23614;
(Continued)

(56) References Cited

U.S. PATENT DOCUMENTS 7,168,083 B2  1/2007 Kalker
7,593,576 B2  9/2009 Meyer
(Continued)

FOREIGN PATENT DOCUMENTS

GB      2479925       11/2011
WO    2014/113465      7/2014
(Continued)

OTHER PUBLICATIONS

Iraj Sodagar, The MPEG-DASH Standard for Multimedia Streaming Over the Internet, 2011, IEEE Computer Society.*
(Continued)

*Primary Examiner* — Hoang-Vu A Nguyen-Ba
(74) *Attorney, Agent, or Firm* — Zhichong Gu; Wong & Rees LLP

(57) ABSTRACT

Essence of a media program can be encoded such that it carries essence identification information and a set of time points. Auxiliary content such as companion content and other auxiliary data can be associated with the essence of the media program by way of the set of time points. The set of time points and/or fingerprints used to retrieve/recover the set of time points can be delivered to one or more of a media device, a companion device/application, etc., in any of a variety of different methods. Through the set of time points and/or fingerprints, and user preferences, the auxiliary content can be retrieved by the one or more of the media device, the companion device/application, etc., presented and/or interacted with a user. In some embodiments, the auxiliary content as described herein can be customized for a specific sender and/or a specific recipient.

31 Claims, 22 Drawing Sheets

(51) Int. Cl.
*H04N 21/462* (2011.01)
*H04N 21/858* (2011.01)
*H04N 21/8547* (2011.01)
*H04N 21/222* (2011.01)
*H04N 21/236* (2011.01)
*H04N 21/235* (2011.01)
*H04N 21/658* (2011.01)
*H04N 21/242* (2011.01)

(52) U.S. Cl.
CPC ..... *H04N 21/23614* (2013.01); *H04N 21/242* (2013.01); *H04N 21/4622* (2013.01); *H04N 21/6581* (2013.01); *H04N 21/8547* (2013.01); *H04N 21/8586* (2013.01); *H04N 21/85406* (2013.01)

(58) Field of Classification Search
CPC . H04N 21/222; H04N 21/242; H04N 21/8547
USPC ..... 725/32; 348/423.1, 425.4, 500; 370/324, 370/350, 395.62, 509, 510, 512; 375/240.28
See application file for complete search history.

(56) References Cited

U.S. PATENT DOCUMENTS

| | | | |
|---|---|---|---|
| 8,156,206 B2 | 4/2012 | Kiley | |
| 8,219,134 B2 | 7/2012 | Maharajh | |
| 8,300,884 B2 | 10/2012 | Sharma | |
| 8,601,504 B2 | 12/2013 | Stone | |
| 2005/0053359 A1* | 3/2005 | Jung | G11B 27/105 386/234 |
| 2005/0177738 A1 | 8/2005 | Van Der Veen | |
| 2006/0031684 A1 | 2/2006 | Sharma | |
| 2010/0070575 A1 | 3/2010 | Bergquist | |
| 2010/0119208 A1 | 5/2010 | Davis | |
| 2010/0299151 A1* | 11/2010 | Soroka | G11B 27/105 704/500 |
| 2011/0010737 A1 | 1/2011 | Bouazizi | |
| 2011/0252118 A1 | 10/2011 | Pantos | |
| 2011/0313853 A1 | 12/2011 | Ramer | |
| 2012/0257112 A1 | 10/2012 | Fritsch | |
| 2013/0007298 A1 | 1/2013 | Ramaswamy | |
| 2013/0047178 A1 | 2/2013 | Moon | |
| 2013/0074141 A1 | 3/2013 | Hwang | |
| 2013/0111514 A1 | 5/2013 | Slavin | |
| 2013/0177199 A1 | 7/2013 | Subramanian | |
| 2013/0212609 A1 | 8/2013 | Sinha | |
| 2013/0246077 A1 | 9/2013 | Riedmiller | |
| 2013/0275899 A1* | 10/2013 | Schubert | G06F 3/0481 715/765 |
| 2013/0308818 A1 | 11/2013 | MacIntosh | |
| 2014/0007156 A1 | 1/2014 | Navin | |
| 2014/0009680 A1 | 1/2014 | Moon | |
| 2014/0013374 A1 | 1/2014 | Oh | |
| 2014/0108020 A1* | 4/2014 | Sharma | G10L 19/018 704/500 |
| 2014/0142958 A1* | 5/2014 | Sharma | G10L 19/018 704/500 |

FOREIGN PATENT DOCUMENTS

| | | |
|---|---|---|
| WO | 2014/113471 | 7/2014 |
| WO | 2014/113478 | 7/2014 |
| WO | 2014/124377 | 8/2014 |
| WO | 2014/204783 | 12/2014 |

OTHER PUBLICATIONS

Begeja, L et al "Contextual Advertising for IPTV Using Automated Metadata Generation" 6th IEEE Consumer Communications and Networking Conference, Las Vegas, NV, Jan. 10-13, 2009, pp. 1-5.

* cited by examiner decode a media data signal into essence of a media program and time-based metadata comprising a grid of time points over the essence of the media program 721 receive data items for a specific time point in the grid of time points that represents a specific location of the essence of the media program 722 generate at least one universal resource locator in reference to the auxiliary content server 723

FIG. 7C send a set of query fingerprints generated based on essence of a media program 761 receive time-based metadata having a grid of time points over the essence of the media program 762 send companion content annotated with the essence of the media program 763

FIG. 7G

```
┌─────────────────────────────────────────┐
│ decode a media data signal into essence │
│           of a media program 771        │
└─────────────────────────────────────────┘
                    │
┌─────────────────────────────────────────┐
│ generate a set of one or more query     │
│              fingerprints 772            │
└─────────────────────────────────────────┘
                    │
┌─────────────────────────────────────────┐
│ Send a request for annotated auxiliary  │
│ content, the request including the set  │
│     of one or more query fingerprints   │
│                   773                    │
└─────────────────────────────────────────┘
                    │
┌─────────────────────────────────────────┐
│ Receive annotated auxiliary content     │
│ items and time-based metadata           │
│ comprising a grid of time points over   │
│    the essence of the media program 774 │
└─────────────────────────────────────────┘
```

FIG. 7H

ENABLING DELIVERY AND SYNCHRONIZATION OF AUXILIARY CONTENT ASSOCIATED WITH MULTIMEDIA DATA USING ESSENCE-AND-VERSION IDENTIFIER

CROSS REFERENCE TO RELATED APPLICATIONS

This application is related to Provisional U.S. Patent Application No. 61/932,772 filed on Jan. 28, 2014, and U.S. Provisional Patent Application No. 62/080,017 filed on Nov. 14, 2014, the contents of which are hereby incorporated herein by reference for all purposes as if fully set forth herein.

TECHNOLOGY

The present invention relates generally to multimedia data, and in particular, to enabling delivery and synchronization of auxiliary content associated with multimedia data.

BACKGROUND

Human beings live in a world of "smart" devices. For example, high quality media devices with advanced networking and media processing capabilities are widely available. However, content delivery and consumption, especially in the broadcast domain, is still largely "dumb," as the advanced capabilities of the media devices are typically insufficiently tapped.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 7A through FIG. 7H illustrate example process flows.

DESCRIPTION OF EXAMPLE EMBODIMENTS

Figure 1:
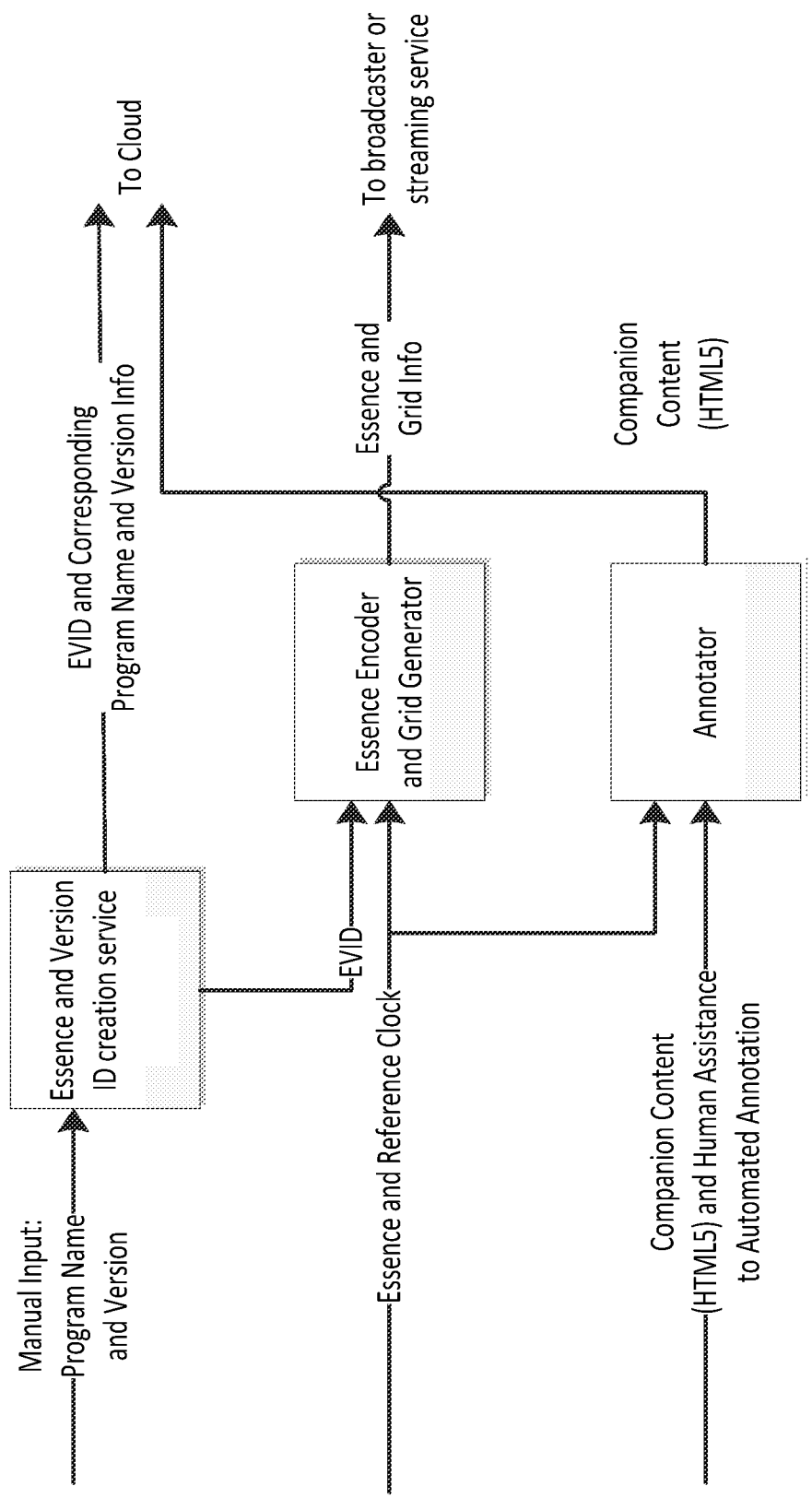
FIG. 1 illustrates example auxiliary content creation.

Example embodiments, which relate to enabling delivery and synchronization of auxiliary content associated with multimedia data, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. STRUCTURE OVERVIEW
3. TABLET VIDEO ON DEMAND
4. TIME-BASED METADATA
5. ADDITIONAL USER EXPERIENCE SCENARIOS
6. HANDLING DATA LOSS AFFECTING GRID INFO
7. "AFTER THE FACT" COMPANION CONTENT CREATION
8. CUSTOMIZED COMPANION CONTENT
9. OTHER SERVICES AND INTERFACES
10. IMPLEMENTATION MECHANISMS—HARDWARE OVERVIEW
11. EQUIVALENTS, EXTENSIONS, ALTERNATIVES AND MISCELLANEOUS

1. General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Techniques as described herein can be used to enable the growth of, access to, and synchronization of rich, time-based information, auxiliary content, etc., which in turn enables novel, meaningful user experiences and content delivery solutions. Examples of these user experiences include, but are not limited to only, personalized audio essence; ubiquitous links to on-screen characters and items; portable viewing history; improved search and discovery, etc. Examples of the content delivery solutions include, but are not limited to only, advertising suggestions, data mining, rights management, etc. At least some of the user experiences and media delivery solutions can be provided or supported through cloud-based systems and/or services.

Under some approaches, TV programs are generally unlinked and lack all but the most generic, non-granular metadata. Electronic Program Guide (EPG) information is usually limited to title, cast, and synopsis, and lacks both links and time-based information, such as which actors, items or locations appear at a given moment.

The problem is not isolated to the broadcast world. Video-on-demand services on tablets and smartphones still generally lack time based metadata or calls to action in media content delivery. There is no accessible format to facilitate creation of and access to metadata in these approaches.

In some embodiments, media content can be delivered with multiple screens such as first and second screens, etc. Techniques as described can be implemented with the multiple screens to enable access to personalized essence (or personalized media content), to provide interactive experiences with extensive links, to provide social and interactive experiences, to support novel media delivery solutions and user experiences, etc.

Personalized essence may include, but is not limited to only, audio programs for up to a large number of different natural languages, not just the one or two languages that might be available in a regular broadcast. For example, if a broadcaster does not include relatively large media data such as immersive audio including audio objects and channel beds, user interactive data, or immersive audio parameters, then such media can be provided to multimedia devices out of band using techniques described herein Immersive audio parameter data refers to audio data (e.g., audio object based data, etc.) that can be used to provide users an immersive sound experience (e.g., as if the users were immersed in the very environment where a film took place, etc.). Interactive object audio data refers to interactive audio data or audio objects (e.g., interactive with media applications, users, etc.).

In an interactive experience with extensive links, a user can be given a menu with links when pausing content. For example, the menu with the links is directly shown via a touch interface on a tablet used to watch the content, on a TV with a remote based interface, on an accompanying screen used with a TV, etc. Items linked through the links may include, but are not limited to only: any of (1) characters, linked to actors' information pages (e.g., IMDB pages of the actors, etc.); (2) products, linked to coupons or "buy" links; (3) accompanying items like recipes (e.g., as related to a watched cooking show, etc.); (4) background music, linked to artist and song info; (5) scene locations, linked to other programs with such scenes or relevant ads; (6) indicators for availability of, and access links to, alternative audio (e.g., immersive audio including audio objects and channel beds, user interactive data, immersive audio parameters, interactive object audio data, etc.); etc. In some embodiments, the links given to the user can also allow "playlisting" (or "portable viewing history") which shows previous ads or programs, in case the user failed to pause previously, thus the moment is not "lost" just because the user allowed an ad or program to pass unpaused.

In some embodiments, time-based metadata about the programs a user watches can be used to support enhanced search and discovery. For example, the time-based metadata could be used to locate other programs for the user.

The social and interactive experiences may include, but are not limited to only: pre-populated social shares allowing users to easily share to social networks with linked, time-specific content moments; fan polls by vote on reality show contestants, or predicted outcomes; static links to dynamically updated additional content including but not limited to only any of: recent reviews, press coverage, popular social posts; etc. A user may hit a share button during a TV show to share, for example, a moment with singer Joey Blue from the TV show "American Hero Singer." A social media post would be automatically composed and sent. The automatically composed social media post may be "I just watched Joey Blue sing on American Hero Singer" without the user needing to manually type this out.

The novel user experiences as described herein, at least partly enabled by time-based metadata and cloud-based auxiliary content (e.g., companion content, cloud-based data, metadata related to the essence of a media program, the companion content or other cloud-based data, etc.), may include, but are not limited to only any of: advertising "suggestions" for interstitials; Media Intelligence; Rights Management; Asset Storage; etc. Examples of companion content may include but are not limited to only any of: alternative audio essence, immersive audio including audio objects and channel beds, alternative natural language audio, immersive audio parameters, interactive object audio data, data/objects related to overlays on a display screen, links to products, media programs, links to schedule test drives for cars in commercials from browsers, etc. Human assistance and input may be needed to annotate some companion content for example annotating a link to come up 20 seconds after the beginning of a corresponding commercial to schedule a test drive for a Jaguar as that might be a good time to display the link to users, etc. Human assistance and input may be needed to annotate some companion content to indicate a specific feature, object (e.g., a Jaguar car, etc.), character (e.g., "Charlie Sheen," etc.), sound segment, etc., at a particular time of a media program, etc. Computer-based annotation can also be used. For example, a computer can be used to watch a media program and automatically recognize a specific feature, object, character, sound segment, etc., at a particular time of a media program. Specific companion content items can be linked to specific features, objects, characters, sound segment, etc. In some embodiments, companion content can be customized for different users, user groups, device types, etc. A "Samsung" device may have different capabilities from a "Kindle" device. Different companion content items can be annotated for different users, user groups, device types, etc. For example, techniques as described herein can be used to provide metadata about the scenes, actors, or location that occurs right before an ad break to advertisers to optimize ad placement. A cruise ad right after a dreamy beach scene is one example. Additionally, optionally, or alternatively, these techniques can be used to analyze metadata to gain insights for content creators, owners and advertisers about what items coincide with people tuning in or out. Studios often have great difficulties in documenting and clearing rights for each moment of a film or TV show. Issues with actors and music for international and TV distribution are particularly bothersome. Additionally, optionally, or alternatively, these techniques can be used to provide a framework that works from the moment media content is created; this can help save the studio much time and stress associated with documenting and clearing rights for each moment of a film or TV show. In some embodiments, metadata as generated under techniques as described herein can be used to provide a framework for secure storage of audiovisual assets.

In some embodiments, a method comprises providing a multimedia system as described herein. In some embodiments, mechanisms as described herein form a part of a studio system, a content creator system, a cloud based content service system, a broadcast network operator system, an internet based system, a multimedia system, including but not limited to a handheld device, tablet computer, theater system, outdoor display, game machine, television, laptop computer, netbook computer, cellular radiotelephone, electronic book reader, point of sale terminal, desktop computer, computer workstation, computer kiosk, PDA and various other kinds of terminals and display units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Structure Overview

To create the experiences above, a system as described herein may introduce a few novel concepts. In some embodiments, essence (e.g., primary content of a media program, etc.) generated by the system carries with additional information, namely time-based metadata, that identifies the content (via an "essence and version ID") and indicates the location in time of various points in the content. For example, the time based metadata could say that a piece of content has essence and version ID "ABC123" and the point in time is "56 seconds" in. Another instance of the time based metadata, later in the piece of content, might have essence and version ID "ABC123" and the point in time is "700 seconds" in. The essence and version ID is a code that represents that the name or other attributes of the content, for example, a film called "Funny Movie" in the version that was theatrically released to United States cinemas. The essence and version ID(s) may exist in both standardized and various (extensible) forms, as described below. The time-based metadata (denoted as "grid" or "grid information") as generated under techniques as described herein, may contain additional information as described in more detail below.

In some embodiments, grid information described herein is created, inserted and/or associated with the audio programming when the audio programming is created or distributed in the form of LPCM (linear pulse-code modulation) audio samples and/or encoded into a compressed format (e.g. Dolby E, Dolby ED2, Dolby Digital, Dolby Digital Plus, Dolby TrueHD, MPEG AAC, MPEG HE-AAC, MPEG USAC, MPEG-H, DTS-HD, DTS-UHD, etc.) for distribution between production/post facilities and broadcasters/MVPD facilities and/or carried within a format tailored for final delivery to users (e.g. Dolby Digital, Dolby Digital Plus, Dolby TrueHD, MPEG AAC, MPEG HE-AAC, MPEG USAC, MPEG-H, DTS-HD, DTS-UHD, etc.). When companion content or additional program elements, at least some of which are intended to be presented in sync with the primary essence/programming/program elements, are authored, they can be authored with corresponding essence and version ID and timing information carried via the grid information as described herein. As described below, in some embodiments, different parties/entities may contribute to, or edit, grid information, and grid information may be added to companion content even if it is authored after the primary content.

Therefore, the combination of the essence ID and the timestamp information (plus other optional aspects of Grid data described below) is utilized to realize the synchronized delivery of companion content/programming directly related to primary programming or program-elements being delivered over a second (independent from the primary transmission's) pathway. This second (and independent) transmission pathway is generally referred to as an "out of band" channel or pathway. Moreover, the term "in band" refers to the carriage of information in the service's primary distribution/transmission pathway (which is usually carrying the primary audio, video and related data streams).

Companion content can include additional audio and/or video essence, metadata, extension data, or additional coding layers that is carried "out-of-band." (e.g., via broadband, IP network, etc.) This is typically done in a dynamic manner, such as in the case of associated information, metadata, substreams, services, or programs carried via a dynamic, non-deterministic channel such as the internet (or a closed IP-based network for some applications). The extension and/or additional coding layers may include information that enables delivery and sample-accurate synchronization of immersive and interactive experiences on a dynamic basis to devices capable of supporting them.

FIG. 1 illustrates example auxiliary content creation. In some embodiments, an "Essence and Version ID" creation service system comprises software, hardware, a combination of software and hardware, etc., configured to receive program information (e.g., the program name and version, etc.) of a media program, for example, from manual input or programmatic input; generate an identifier (e.g., "essence and version ID (EVID)," etc.) of the media program based on the received program information of a media program; output the identifier and the corresponding program information (e.g., the program name and version, etc.) of the media program to one or more recipients; etc. The recipients may include one or more of a cloud based auxiliary content service system, an essence encoder and grid generator, an annotator, etc. An identifier of a media program as described herein can be generated in a wide variety of ways. In some embodiments, an identifier of a media program can be assigned by the essence encoder and grid generator. In some other embodiments, an identifier of a media program can be assigned without a host device. In an example, an identifier of a media program may be a randomly generated universally unique identifier (UUID), for example, a 128-bit UUID, etc. In some embodiments, a UUID may be used in place of, or alternatively in addition to, an assigned identifier for the purpose of identifying (e.g., essence of, etc.) a media program. One or more identifiers (e.g., unique from one another among the one or more identifiers, etc.) can be created for the same media program. For example, the one or more identifiers of the media program may comprise one or more UUIDs without risk of collisions (e.g., collisions caused non-unique identifiers, etc.), as each of the UUIDs can be made unique from the others of the UUIDs. Other types of identifiers such as EIDR, Nielsen ID, Gracenote ID, Ad-ID, etc., can also be used to identify a media program. Additionally, optionally, or alternatively, such an identifier can be used in one of a few ways: (1) an identifier for a media program is included as a part of grid info (or grid information) as soon as the identifier is generated. This may be the case if a content creator has access to the grid info or the grid-linked cloud (e.g., cloud-based auxiliary content systems, etc.) immediately as the identifier is obtained; (2) a system copies an earlier-generated identifier value into grid info or the grid-linked cloud; (3) a system uses a web interface or API to obtain the identifier from a registry for identifiers and media programs, based on human readable program-level metadata such as title, year, director, etc. This can be done in cases where the human-readable data has flowed to a grid data authoring layer, but the identifier has not. Once the identifier is obtained, it can be inserted into grid info or the grid-linked cloud; etc. Procedures similar to the above described procedures for this identifier may be followed for other identifiers. Additionally, optionally, or alternatively, an identifier may be carried out-of-band, or in-band with respect to a media program the identifier is used to identify.

In some embodiments, the essence encoder and grid generator comprises software, hardware, a combination of software and hardware, etc., configured to receive the identifier (e.g., EVID, etc.) of the media program, an input version of essence (e.g., media sample data, audio data, video data, audiovisual data, etc.) of the media program, and a reference clock signal; based on the identifier of the media program, the input version of essence, and the reference clock signal, generate an output version of essence of the media program and grid info of the media program; output the output version of essence of the media program and grid info of the media program to recipients such as broadcasters, streaming service systems; etc. A reference clock, or a reference timeline representing a reference clock, as described herein can be generated in a wide variety of ways. In some embodiments, the reference clock, or the reference timeline, can be generated by the essence encoder and grid generator. In some other embodiments, a reference clock, or a reference timeline representing the reference clock, can be sourced from a clock source other than the essence encoder and grid generator. Other types (e.g., frame index, audio data block index, a radio-based clock, etc.) can be used as reference clocks or reference timelines as described herein. Additionally, optionally, or alternatively, a reference clock or a reference timeline representing a reference clock may be carried out-of-band, or in-band with respect to a media program.

In some embodiments, the annotator comprises software, hardware, a combination of software and hardware, etc., configured to receive the identifier (e.g., EVID, etc.) of the media program, an input version of essence (e.g., media sample data, audio data, video data, audiovisual data, etc.) of the media program, a reference clock signal, an input version of companion content, input data relating to HTML5 data generation, human assistance to automated annotation, etc.; based on the received information, generate an output version of companion content that comprises companion content portions, static and/or dynamic links to companion content portions, static and/or dynamic links to data, and static and/or dynamic links to non-interactive and/or interactive operations, some or all of which have been annotated to specific grid time points in a grid (of time points) as represented by the grid info as mentioned; output the output version of companion content with annotations to the specific grid time points in the grid of time points to one or more recipients such as the cloud based auxiliary content service system, etc.; etc.

For example, as it processes a video program, the annotator identifies locations of specific characters and items in various frames. This can be done manually by humans, automatically by machine, as a combination of the two, etc. Additional human input may be required to create links and static depictions of linked items. Human input and assistance may be provided through a human input interface, etc.

In some embodiments, the annotations as generated by the annotator in (e.g., human-readable, etc.) are stored as XML, HTML5 data, non-XML data, non-HTML5 data, etc., in annotation data repositories—e.g., in the cloud based auxiliary content service system as mentioned above, etc. For a video segment between two adjacent or between two non-adjacent grid time points in the grid of time points, a (e.g., XML, non-XML, etc.) header file which contains generally static information such as actor and character names, and a (e.g., XML, non-XML, etc.) body file which contains frame-by-frame data about present characters in the video segment and box locations. For relatively long video segments in which characters may change considerably, multiple "chunked" header and body files can be used.

Additionally, optionally, or alternatively, the annotations may include a variety of types of companion content that can be delivered to primary and secondary screens (or first and second screens as previously mentioned). In some embodiments, XML data can be used in conjunction with HTML5 data in the framework. In some embodiments, the companion content, as delivered to the user or the user device, is tightly coupled in time with the (original) essence. In some embodiments, functions such as HTML5 functions Date( ).getTime( ), etc., can be used to facilitate this coupling or synchronization in time between the companion content and the essence.

As discussed, an annotation data repository can be a part of a cloud based auxiliary content service system. The annotations stored in the data repository may be accessed by creators and consumers of companion content.

For the purpose of illustration only, example embodiments as described herein may refer to audio, video, grid info encoding, HTML5, XML, etc. It should be noted that audio, video, etc., are used as examples of media content for the purpose of illustration; techniques as described herein can be similarly applied to other media content types. Furthermore, it should be noted that grid info is used as an example of logically indexing media content in time. Other methods of indexing media content in time, including but not limited to different granularity levels, can also be used to indexing media content in time. Similarly, it should be noted that HTML5, XML, etc., are used as examples of file or data format in which companion content, static and/or dynamic links, interactive and/or non-interactive data, etc., can be delivered to and supported by a media device such as a smart player, a set-top box, a companion device, etc. Other file or data formats in place of, or in conjunction with, HTML5, XML, etc., can also be used to deliver companion content, static and/or dynamic links, interactive and/or non-interactive data, etc., to, and supported by, a media device.

Techniques as described herein can be used to support a wide variety of user experience use cases and/or scenarios. For the purpose of illustration only, a number of "essence and interaction" use cases and scenarios are considered in detail. However, the techniques can also be used to support other use cases and scenarios in which essence and auxiliary content can be accessed, for example, in an interactive manner.

For the purpose of illustration only, a multimedia device is assumed to be able to synchronize audio and video (e.g., between audio essence and video essence, etc.) in a media content item; one or more of these user experience scenarios may involve "pause" operations; essence of a media program represents multimedia data; companion content represents (e.g., at least a portion of, etc.) auxiliary data. For the purpose of illustration only, it has been discussed that HTML5, human assistance, etc., can be used as optional parts of techniques as described herein. It should be noted that auxiliary content as described herein can be in any multimedia format (not just HTML5), and some or all of the auxiliary content can be manually created without any automation (e.g., automatically generated by machine, etc.) in some embodiments. For example, the auxiliary content may be manually entered sports statistics, an alternative language audio mix, etc.

3. A Video-on-Demand Example

To help explain the proposed system, consider an example user experience scenario, where audiovisual essence of a media program is presented by a player on a tablet; and interaction involving companion content is done via a touch interface built into the player.

Figure 2:
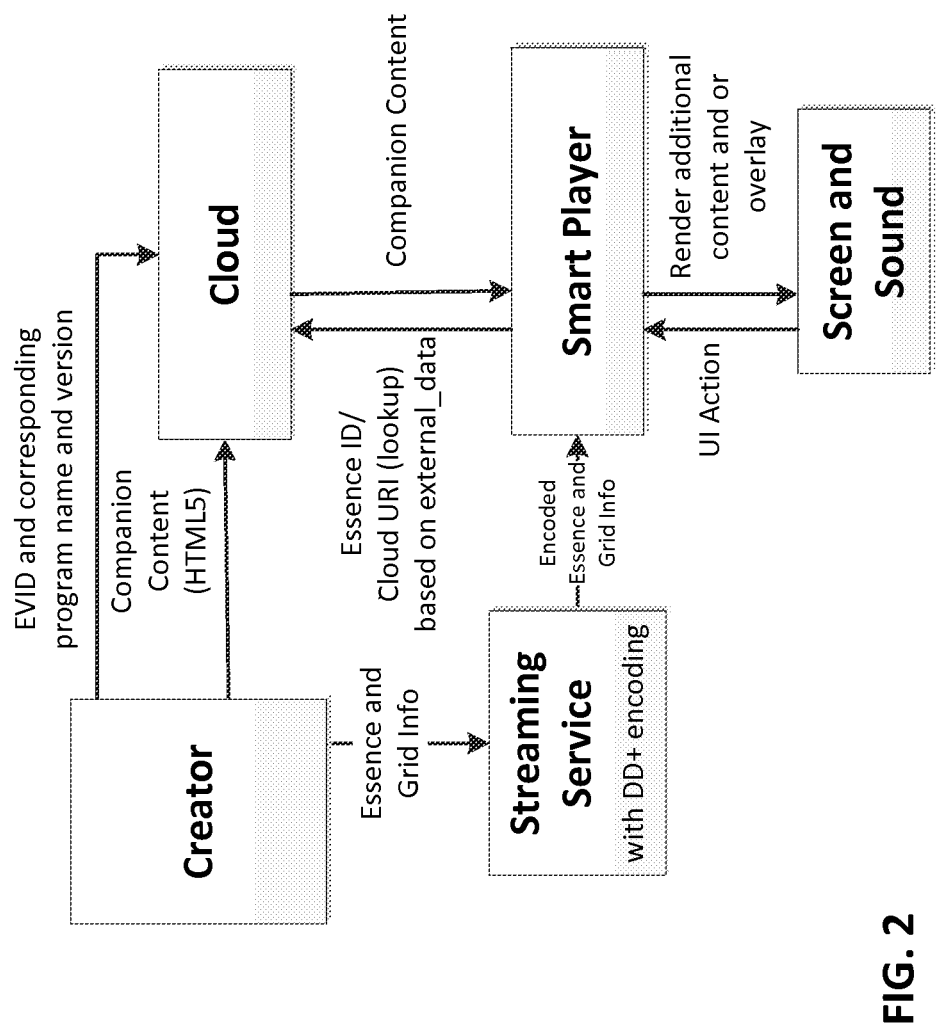
FIG. 2 illustrates example components involved in enabling delivery and synchronization of auxiliary content associated with multimedia data.

FIG. 2 illustrates example components involved in enabling delivery and synchronization of auxiliary content associated with multimedia data in this example user experience. In some embodiments, a content creator (e.g., a system comprising the EVID creation service, the essence encoder and grid generator, the annotator, etc.) is configured to output an output version of essence of a media program and grid info of the media program to recipients such as a streaming service system with media content encoding capability (e.g., by incorporating or implementing DD+ encoding techniques commercially developed by Dolby Laboratories, Inc., San Francisco, Calif., etc.); output the identifier (e.g., EVID, etc.) and the corresponding program information (e.g., the program name and version, etc.) of the media program, the output version of companion content with annotations to the specific grid time points in the grid of time points, etc., to one or more recipients such as a cloud based auxiliary content service system, etc.; etc.

In some embodiments, the cloud based auxiliary content service system comprises software, hardware, a combination of software and hardware, etc., configured to receive a request for auxiliary content, the request comprising an essence ID (e.g., EVID, etc.) and a cloud URL for lookup from a media device such as a smart player, a set-top box, a companion device, etc.; fetch some or all companion content and other auxiliary information associated with the essence ID and the cloud URL for lookup; send the companion content and other auxiliary information associated with the essence ID and the cloud URL for lookup to the media device; etc.

In some embodiments, the streaming service system comprises software, hardware, a combination of software and hardware, etc., configured to receive the output version of essence of a media program and grid info of the media program from an upstream device or module such as the content creator, etc.; encode the output version of essence of a media program and grid info of the media program into a media data signal; output the encoded (output version of) essence and grid info of the media program in the media data signal to a plurality of downstream devices such as a smart player, a set-top box, a companion device, an audio video receiver (AVR), etc. In some embodiments, the streaming service system is configured to send the grid info of the media program as a portion of metadata having separate carriage from that of media sample data, etc., in the media data signal.

A smart player as described herein refers to a media device that comprises software, hardware, a combination of software and hardware, etc., including but not limited to at least a media playing application. The smart player can be configured to decode encoded essence and grid info of a media program from a grid info container (e.g., as a part of media metadata that flows with the essence of the media program, etc.) that is encoded or embedded within an input media data signal. In some embodiments, the smart player extracts a portion of metadata such as external_data comprising the grid info of the media program from the input media data signal; based on the external_data, generate or obtain an essence ID (e.g., EVID, etc.) and a cloud URL for lookup; query a cloud based auxiliary content service system with a request comprising the essence ID and the cloud URL for lookup; receive/fetch some or all companion content and other auxiliary information associated with the essence ID and the cloud URL for lookup, in a reply from the cloud based auxiliary content service system to the request of the smart player; etc.

In some embodiments, the smart player, or the media playing application therein, is configured to (e.g., optionally, etc.) display annotations in XML and/or HTML files in conjunction with essence of a media program for which the annotations have been created; to provide an interface with standard player features to support UI actions such as file selection, play, pause, scrub, mute, volume, etc.; to provide an enhanced interface with additional features such as selecting the display (or not) of companion content such as annotations or alternative essence; etc. In some embodiments, the enhanced interface may be implemented as an HTML5 based UI configured to display annotations and companion content in XML and/or HTML files, to render alternative audio essence (e.g., in a different natural language than those carried in the main audio essence, etc.), to play, display, render, etc., the annotations, companion content, alternative audio essence, etc., in time with corresponding video essence.

For the purpose of illustration only, in on-demand tablet video playback, a user may begin by opening a video in an enhanced player application on the smart player. The chosen video can be played in the smart player with operational enhancements, auxiliary content enhancements, etc. The enhancements implemented by the smart player, or the enhanced player application therein, may include, but are not limited to only any of: (1) an info bar, which may appear at the top of the player screen (in some embodiments, the info bar can be set to appear anywhere else on screen). It shows a list of characters (and their corresponding actors) and special items, such as placed products; (2) color coded overlay boxes, which show items and actors noted in the info bar. For example, a character "Ross" may be shown with an orange box in the info bar. Then the video of Ross may also be shown with an orange box around the character. The box may move along with the video essence; (3) an indicator of when "Info and Overlay" enhancements are available. When the player UI (e.g., play, pause, volume, scrub, etc.) appears, the indicator may also show up and light up blue if features related to "Info and Overlay" enhancements are available. The user may tap buttons representing these features to activate or deactivate the features; etc.

Under techniques as described herein, a media device such as a smart player, a set-top box, a companion device, etc., can be configured to determine where to obtain auxiliary content such as HTML5, XML files, non-XML files, non-HTML5 files, etc., which the smart player requires for a given media program. In some embodiments, the determination of a cloud based auxiliary content service system can be made with an EVID, which is described in more detail below.

Under techniques as described herein, a media device such as a smart player, a set-top box, a companion device, etc., can be configured to ensure that auxiliary content such as HTML5 or XML data, etc., is shown at the correct, corresponding time of corresponding essence. In some embodiments, this can be facilitated via time-based metadata such as external_data (e.g., as a part of the essence audio bitstream, etc.), for example, transmitted in a media data signal. To create a compact version of external_data, a shortening service such as a URL shortening service, etc., can be used to encode grid info of a media program including but not limited to the essence and version of the media program. For the purpose of illustration only, it has been described that a content creator sends companion (or auxiliary) content to the cloud. However, in various embodiments, a streaming service, or even a third party, which may or may not be a content creator, can also send such data to the cloud. In addition, for the purpose of illustration only, it has been described that a smart player is a system component that interacts with the cloud. However, in various embodiments, another media player, even a relatively "dumb" or simple player, other than a smart player, can be in charge of playback of a media program as described herein; such a non-smart player may operate in conjunction with an output device that is smart or configured to be capable of using time-based metadata to interact with the cloud to retrieve auxiliary (companion) content to the media program, to interact with a user to get selections of options, etc. A non-limiting example of such an output device is a downstream audio video receiver (AVR) that is configured to receive grid info with a media program, interact with a user for making selections such as a selection of Spanish language for the media program, to then fetch and output a Spanish language mix to a media player. Thus, in some embodiments, techniques as described herein can work with a player that just controls play, pause, fast forward, rewind, etc., be relatively "dumb" or simple, and operate with a smart output device configured to fetch and synchronize auxiliary content with the essence of the media program, as illustrated in FIG. 3D. (In this figure, "Soundbar" could also be an AVR.)

4. Time-Based Metadata

Time-based metadata, which can be carried in some embodiments, as "external_data" in a media data signal, etc., can be used by one or more systems, components, etc., to enable delivery and other operations related to auxiliary content of a media program and interaction between auxiliary content and essence of the media program. In some embodiments, time-based metadata represents one or more portions of media metadata that flows along with media sample data or the essence of a media program. The time-based metadata may be grid info (e.g., a grid of time points over the essence of the media program, etc.) that is stored in and carried by a data container (e.g., grid info data container, etc.) within the media metadata that flows along with the media sample data or essence. The grid info can be relatively lightweight and comprise time points each of which may indicate what the media program is and what time index into the media program is at a time corresponding to that time point. Additionally, optionally, or alternatively, the media metadata (e.g., the grid info, etc.) may identify which of a studio, a TV network, a distributor, or a third party provides ratings. Additionally, optionally, or alternatively, the media metadata (e.g., the grid info, etc.) may identify who authored EVID and time codes for time points in the grid of time points over the media program. Additionally, optionally, or alternatively, the media metadata (e.g., the grid info, etc.) may identify what URL (or URL stem) to contact to fetch cloud-based data (e.g., auxiliary content, etc.). The grid info allows a smart player to do a few things via the cloud such as (1) find out what is available and possibly what the end user has rights to consume (2) based on user choices and the grid info, fetch auxiliary content from the cloud (e.g., one or more cloud-based auxiliary content systems, etc.). That auxiliary content could include both alternative audio (e.g., hybrid audio, etc.) and time-based rich information such as what characters are on screen in a given scene, etc. Time-based information retrieved from the cloud based on the time-based metadata and the time-based metadata may be processed differently by the smart player. For example, the time-based information such as the alternative audio, character information for a scene may be rendered for the user to hear or view, the time-based metadata needs to be integrated with user interfaces of the smart player in a user-friendly way (e.g., with user-friendly graphic user interface components rather than a long textual list, etc.) that allows a user of the smart player to relatively easily and efficiently obtain and consume time-based information such as auxiliary content retrieved from the cloud.

In some embodiments, the time-based metadata such as external_data provides sufficient information to uniquely identify a particular media program (e.g., an audio program, a video program, etc.), including uniquely identifying a particular time point in that program, so that the cloud based auxiliary content service system, upon receiving information of the particular time point of the particular media program, may serve to a media device corresponding auxiliary content such as companion content corresponding with the particular media program.

In some embodiments, the grid info of a media program is encoded by an upstream device (e.g., a Dolby® Digital Plus (DD+) encoder, an encoders implementing techniques as described herein, etc.) into a media data signal such as a media bitstream (e.g., encoded in a coding syntax that supports coding of the grid info, etc.). The grid info travels along (e.g., carried in band in the media data signal, etc.) with essence (e.g., audio essence, video essence, etc.) of the media program.

The grid info can, but is not limited to only, be sent with a specific (e.g., fixed, etc.) frequency (e.g., once per a fraction of second, once per second, once per five seconds, etc.). In various embodiments, the grid info that identifies a source of auxiliary content and a specific time point of the media program can be sent in the specific frequency as one of a variety of frequencies ranging from several times per frame to once every 30+ seconds. In some embodiments, the specific frequency at which the grid info is sent represents a trade off between an available data rate (e.g., which can be relatively low in a constrained environment, etc.) and a low latency user experience (e.g., below a threshold response time above which an average user may feel frustration, etc.).

In some embodiments, the grid info comprises a set of time point data items at the specific frequency. The set of data items may identify a series of time points of the media program in a relatively coarse granularity (e.g., every fraction of a second, every second, every five seconds, etc.) as compared with a media sample granularity (e.g., a time point corresponding to a specific media sample such as an audio sample, a video frame, etc.). The grid info may include a set of additional time point data items for a specific time point in the series of time points, when a finer granularity is needed for an auxiliary content item. The set of additional time point data items may be sent irregularly only when necessary, and can be combined with the specific time point in the series of time points, as identified by the set of time point data items, to a precise location or point of time (e.g., accuracy down to a specific audio sample in audio essence, etc.) in the media program.

In some embodiments, not all data items in the grid info are, or need to be, sent each and every time. In some embodiments, all the data items as described herein can be sent at each instant of a time point in the grid. In some embodiments, only a subset of time point data items (e.g., core data items defining specific time points, etc.) is sent each and every time but some other data items (e.g., data items defining time constant information or slow changing information, etc.) are not or are sent less frequently. In some embodiments, a variable number of data times may be sent from time point to time point.

In some embodiments, not all data items in the set of time point data items of the grid info are, or need to be, sent at the same specific frequency. For example, a subset of data items in the set of time point data items may be sent at the specific frequency as the subset of data items represent more time varying information (e.g., a specific number of seconds from the beginning of the media program, etc.), while other data items in the set of time point data items can be sent (e.g., repeated, etc.) at a frequency lower than the specific frequency as the other data items represent more time constant information (e.g., the location of the cloud based auxiliary content service system, etc.).

In some embodiments, one or more data items in the grid info comprise or can be used to construct one or more server locations (e.g., the parts of URIs identifying web portals or web addresses, etc.) that identify one or more cloud based auxiliary content service systems for locating additional information about the media program. An example of such a server location is "https://secure.dolbycloud.net/". In some embodiments, a server location does not change often. Thus, the server location may be sent much less frequently, perhaps once every several seconds (so a media player is assured to get the server location in the several seconds even if the media player just starts playing the media program). For a media player that plays and obtains the server location from the beginning of the media program, any delay would rarely occur, because the URI would almost never change in some embodiments.

In some embodiments, one or more data items in the grid info comprise, or can be used to construct, one or more URI stems (e.g., the rest of URIs that follow the parts of URIs identifying web portals or web addresses, etc.) that, when combined with the one or more URLs (e.g., server locations such as "secure.dolby.com", etc.) identify one or more resource locations for auxiliary content. In some embodiments, the URI stems can change frequently, perhaps with every media program, with every scene of a media program, etc. Thus, the URI stems can be sent frequently, e.g., every second, because a media device such as a smart player, etc., cannot retrieve companion content without knowing exactly which URI to hit or access.

In some embodiments, the one or more data items in the grid info comprise a binary or hexadecimal sequence representing an "essence and version" identifier (EVID) that uniquely identifies essence (e.g., used to be played by a media player without capability of presenting auxiliary content, etc.) of a media program, a version of the media program. An example of the binary code sequence can be, but is not limited to only, "0xFFEEDDCCBBAA," generated for an example episode of the TV show "Friends." In an example, a user or a computing system collects the program and version information for the example episode, such as program type: "TV show"; title: "Friends"; season: 1; episode: 3; language: EN; version: "Original USA broadcast," etc. In some embodiments, since the program and version information represents time constant information of a media program, the program and version information may be sent to a shortening service (e.g., a bit.ly-like service, etc.) which returns a (e.g., short, etc.) binary code such as a hexadecimal sequence of "0xFFEEDDCCBBAA," etc. It should be noted that content identifiers as described herein are extensible. In some embodiments, this may mean two things First, the identifier need not be in only one format, such as the 12 digit hexadecimal example given above. The identifier could also be 16 bytes 8 bytes or any other format, including but not limited to, one or more of EIDR, Ad-ID, Nielsen identifiers, Gracenote identifiers, etc. Second, there could be more than one contributor or creator of essence identifiers. For example, one or more of a content distributor, a content creator, other intermediaries or entities, etc., could generate and/or insert identifiers.

In some embodiments, the one or more data items in the grid info comprise a time code that specifies the exact time (e.g., representing a time point in the series of time points as mentioned above, etc.) into the program at a time granularity level such as in fractions of second, seconds, etc. For example a value of "53" for the time code may represent the 53rd second of the program (assuming that the media program starts with the 0th second). In some embodiments, the time code is binary encoded (e.g., 0x35 in a hexadecimal notation for the 53rd second, etc.).

In some embodiments, time points in the series of time points are specified by the time code in integer values and are limited in accuracy and time granularity (e.g., to specific seconds, etc.). However, some auxiliary content items (e.g., HTML5 and/or XML data, other auxiliary content, etc.) may need to be served at a time precision that is higher than that supported by the series of time points (or time series). For example, a URI can be linked to the 53rd second in the series of time points, but auxiliary content accessed by the URI may need to be served at exactly 53.264 seconds from the beginning of the media program.

In some embodiments, techniques as described herein can be used to enable the smart player to know to present the linked auxiliary content 0.264 seconds after it receives the grid info corresponding to the time point representing the 53rd second of the media program. In some embodiments, data items in the grid info are sent to the smart player (e.g., on an as-needed basis, etc.) to identify a specific time in reference to a specific time point in the series of time points such as the time point representing the 53rd second of the media program.

In some embodiments, time points and specific times in reference to specific time points as included in the grid info may not be values representing integer values in terms of numbers of media frames (e.g., audio frames, video frames, etc.). For example, a time point or a specific time specified in the grid info may correspond to a specific fraction or a specific media sample (e.g., audio sample, a data block in a video frame, etc.) of a specific media frame of the media program. In some embodiments, additional data items in the grid info are sent to the smart player (e.g., on an as-needed basis, etc.) to identify a specific media sample in reference to a specific time point in the series of time points or a specific time from a time point in the series of time points. Thus, techniques as described herein can be used to link or time synchronize auxiliary content with a media program accurate to a specific media sample in the media program for simultaneous presentation.

In some embodiments, the one or more data items in the grid info comprise identifying information (e.g., binary or hexadecimal sequence, etc.) representing a sender of the media program and/or a recipient of the media program. For example, the sender may, without limitation, be Comcast in San Francisco, and the recipient is any person living in the postal code 94107. Since this information is relatively time constant in the media program, it may be sent to a shortening service (e.g., a bit.ly-like service, etc.) to return a (shortened) binary or hexadecimal code such as "0xE9820C8A," etc. The identifying information as described herein may be generated and sent to downstream media devices by a broadcaster during the broadcast encode time, rather than by the creator of auxiliary content linked to the media program at the auxiliary content creation time.

In the present example, the one or more data items in the grid info such as an external_data instance that indicate an auxiliary content item to be played at a specific time of the media program may be used to generate a concatenation of all the information described above, for example, a hexadecimal string of "0xFFEEDDCCBBAA35E9820C8A," not including the URI portion identifying a server location.

When the grid info is decoded by a media device such as the smart player, the media device can query the one or more cloud based auxiliary content service system with the information derived from the grid info and obtain auxiliary content for the media program at a specified time. The auxiliary content obtained from the one or more cloud based auxiliary content service system may be targeted from the specified sender to the specified recipient. In the present example, the smart player can query a cloud based auxiliary content service system with a URI such as "https://secure.dolbycloud.net/FFEEDDCCBBAA35E9820C8."

In some embodiments, the grid info, or any external_data instance decoded thereof, does not contain annotation data itself. As used herein, the annotation data refers to annotated auxiliary content. Rather, the grid info, or any external_data instance decoded thereof, provides an (e.g., time-based) index to the annotation data. In some embodiments, annotations (or auxiliary data in general) between auxiliary content and essence of a media program are created after the essence of the media program. In some embodiments, at the content creation time for the essence of the media program, the creator system (possibly with user input in some embodiments) can query a shortening service (e.g., a bit.ly-like service, etc.) to get a compact essence and version ID or "EVID" for the essence of the media program. The creator system can be configured to provide or feed a media content encoding system (e.g., a streaming service system, a broadcaster, etc.) with the EVID. The media content encoding system can include the EVID as part of metadata such as external_data, etc., in an output media data signal.

In an alternative embodiment, the media content encoding system itself can be configured to query a shortening service (e.g., the bit.ly-like service, etc.) to obtain program information such as the EVID, a shortened string or URL for a media program (e.g., "GoTs3e1, etc.), etc.; thus, in this alternative embodiment, the creator system can simply provide the essence of the media program to the media encoding system without needing to generate or provide the EVID, the shortened string or URL for the media program, etc., to a recipient such as the media encoding system. In various embodiments, the creator system may provide to the recipient system (1) the essence only (the recipient system may use automatic content recognition techniques based on fingerprints/signatures generated based on the essence for the purpose of obtaining additional information of the media program such as the shortened string or URL for the media program, etc.,); 2) the essence plus one or more of the EVID of the media program, the shortened string or URL for the media program, etc.; etc.

As discussed above, in some embodiments, when essence of a media program is sent to an annotation service or an annotator of FIG. 1, the EVID can be provided to the annotator with the essence of the media program and other input data. Therefore, annotations as generated by the annotator between the essence of the media program and auxiliary content can be stored in a cloud based auxiliary content service system with the EVID. Later on, a user's smart player can query the cloud based auxiliary content service system with the same EVID and find the annotations generated by the annotator. In some embodiments, the smart player can also query and obtain human readable essence name and version information from the cloud based auxiliary content service system using the same EVID.

In some embodiments, time-based metadata such as grid info of a media program as described herein can be sent between a sender and a recipient at one of a variety of available data rates. In some embodiments, time-based metadata refers to grid info (or data) that allows a recipient device of the grid info to access time-based rich information, auxiliary content, companion content, etc. In some embodiments, the time-based metadata may be relatively simple and lightweight, and can be used to fetch time-based rich information, auxiliary content, companion content, etc., correlated with or annotated to various time points of the media program. The time-based rich information, auxiliary content, companion content, etc., fetched based on the time-based metadata can also be time-based, for example, dynamically changing among different time points in a grid of time points over the essence of a media program. A given time point in the grid of time points may specify what the media program is, for example American Hero Singer episode 109, and/or where in time the media program is, for example 423 seconds into the media program. The time-based rich information, auxiliary content, companion content, etc., may be stored in, and retrievable from, the cloud (e.g., in one or more cloud-based auxiliary content systems, etc.). This cloud-based delivery may also be referred to as "out-of-band." For example, based on a given time point (e.g., 423 seconds into the media program that is American Hero Singer episode 109, etc.) as specified in the grid info, time-based rich information such as what actors are on which portion of an image, a scene, etc., at that time point, links to profiles of the actors, recommendations for viewers/specific user, auxiliary content such as alternative audio, Spanish language audio, etc., can be retrieved from the cloud (e.g., one or more auxiliary content systems, etc.). In some embodiments, at least a portion of time-based rich information, auxiliary content, companion content, etc., is not carried in-band with the essence of the media program, but can be fetched from the cloud based on the time-based metadata carried in band with the essence of the media program. In some embodiments, at least a portion of time-based rich information, auxiliary content, companion content, etc., may be carried in-band with the essence of the media program, and is not necessary to be fetched from the cloud based on the time-based metadata carried in band with the essence of the media program. Note that grid-info is an example of time-based metadata—carried in band with the essence of the media program—that can be used to fetch time-based (e.g., rich, etc.) information, rather than a part of time-based information to be fetched based on time-based metadata carried in band with the essence of the media program.

In some embodiments, additional carriage of time-based metadata as described herein in a media data signal can be implemented in a manner that is compatible with existing specification governing the media data signal. In some embodiments, the size and frequency of external_data instances in grid info of a media program are chosen carefully to allow these metadata instances to flow through various components of a streaming service system, a broadcast or on-demand system, etc., including any components in the chain that has a direct or indirect limit on data rate. For example, in some scenarios, there is a frame rate of 31.25 frames per second in a media encoding system (e.g., a Dolby® Digital Plus encoder, etc.). There may exists a certain ceiling number of bytes (e.g., 2 bytes, 16 bytes, etc.) per frame for carrying (e.g., in a reserved data field, in a previously unused data field, etc.) the external_data instances in certain versions (e.g., version 1.4, a different version, etc.) of media encoder. In some embodiments, an external_data instance larger than 2 bytes, 16 bytes, etc., can be serialized to 2 bytes, 16 bytes, etc., per frame. The net effect of the ceiling number of bytes per frame is that there may be a maximum allowable grid info (or external_data) rate (e.g., 62.5 bytes/sec, 8×62.5 bytes/sec, etc.) if the certain versions of media encoder are used in the chain. A smaller threshold rate (e.g., 62 bytes/sec, etc.) than the maximum allowable grid info rate (e.g., 62.5 bytes/sec, 8×62.5 bytes/sec, etc.) may be used by a system such as an annotator to throw an error if a user attempts to insert more data than what can be carried at the threshold rate.

5. Additional User Experience Scenarios

Techniques can be used to support other user experience scenarios other than those related to displaying and interacting with essence of a media program and companion content with a touch surface of a tablet. Example of user experience scenarios include, but are not limited to only any of: (1) displaying and interacting with essence of a media program and companion content with a touch surface of a tablet as previously discussed; (2) displaying video-on-demand media content (e.g., obtained over an IP transport, etc.) as essence of a media program on a TV screen and interacting with auxiliary content presented on the TV screen with on-screen menus and a remote control; (3) displaying video-on-demand media content (e.g., obtained over an IP transport, etc.) as essence of a media program on a TV screen and interacting with auxiliary content presented on a company screen; (4) displaying broadcast media content (e.g., obtained over a broadcast medium, etc.) as essence of a media program on a TV screen and interacting with auxiliary content presented on the TV screen with on-screen menus and a remote control; (5) displaying broadcast media content (e.g., obtained over a broadcast medium, etc.) as essence of a media program on a TV screen and interacting with auxiliary content presented on a company screen; etc.

The differences between user experience scenario (1) and user experience scenarios (2) and (3), and similarly between user experience scenario (1) and user experience scenarios (4) and (5), pertain to the types of interface used to display the companion content.

For the purpose of illustrating the differences from user experience scenario (1), user experience scenario (4) may be used for discussion below. Different challenges arise for user experience scenario (4) than those arising for user experience scenario (1). For example, there may exist a greater chance in user experience scenario (4), due to legacy infrastructure, for grid info to be lost between a creator system that creates the grid info and a broadcaster system's emission codec (e.g., over the cable, over the air, via a satellite, etc.).

Figure 3A:
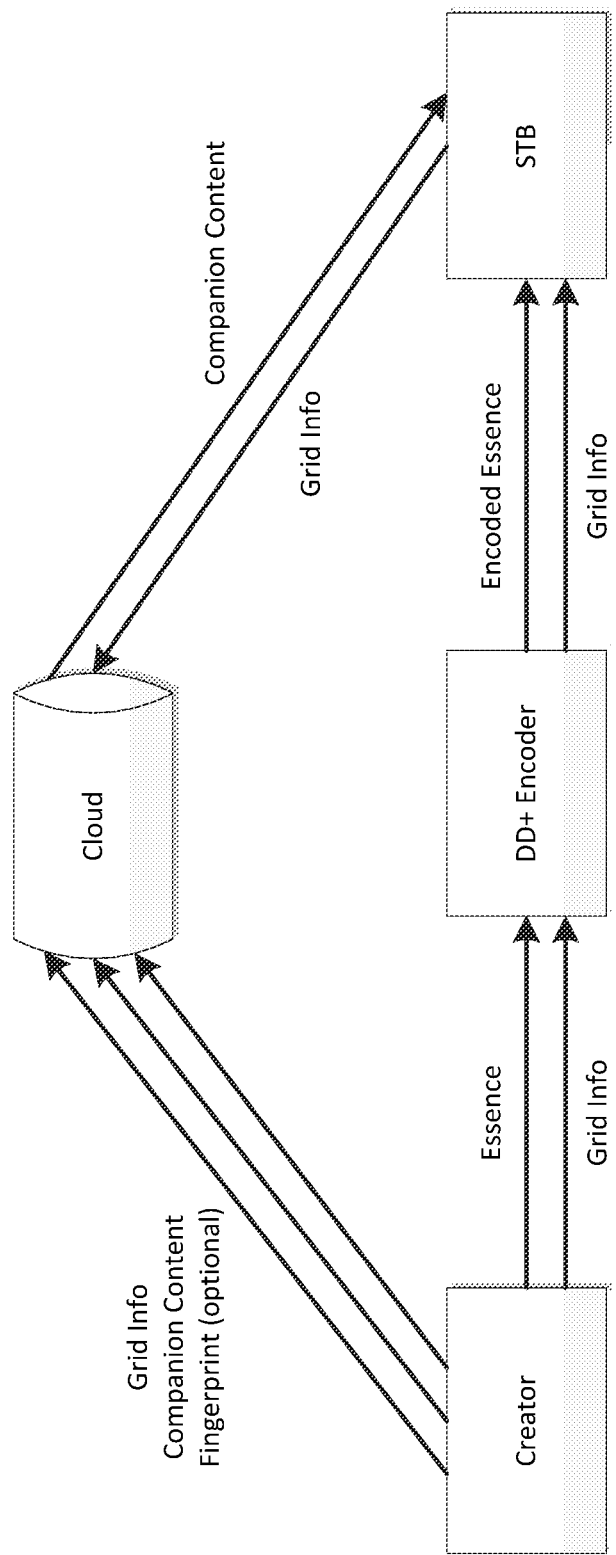
FIG. 3A through FIG. 3D illustrate example configurations in enabling delivery and synchronization of auxiliary content associated with multimedia data.
Figure 3B:
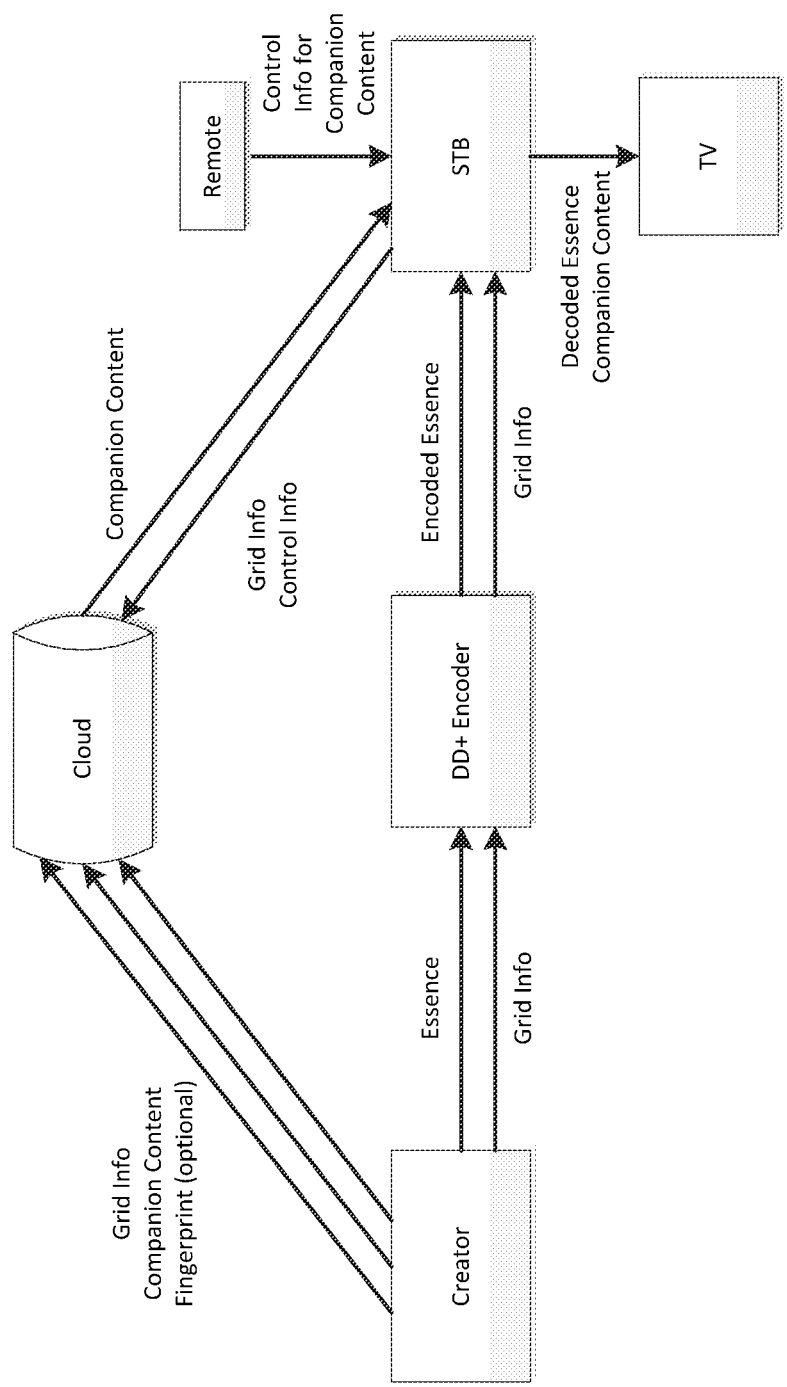
Figure 3C:
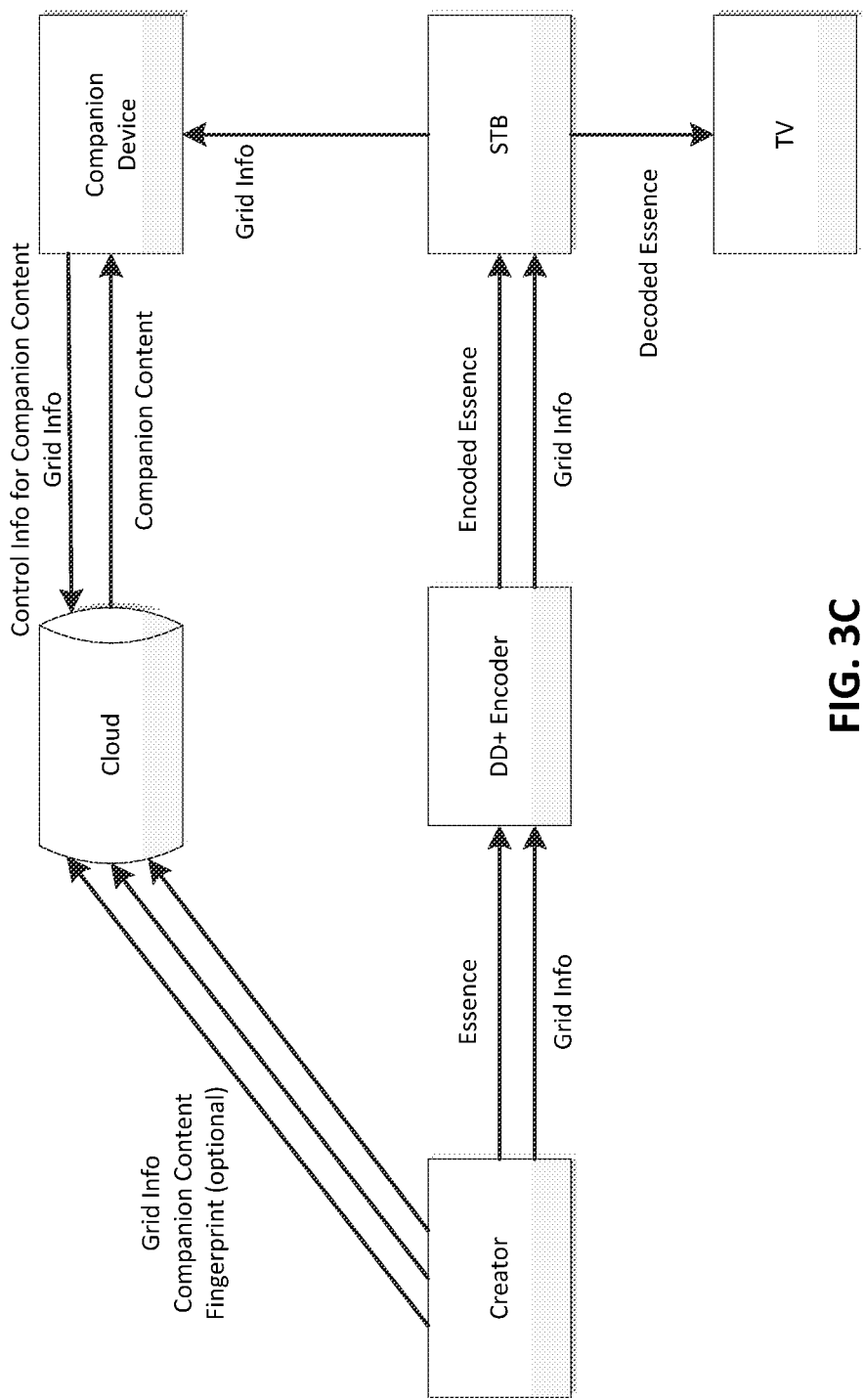
Figure 3D:
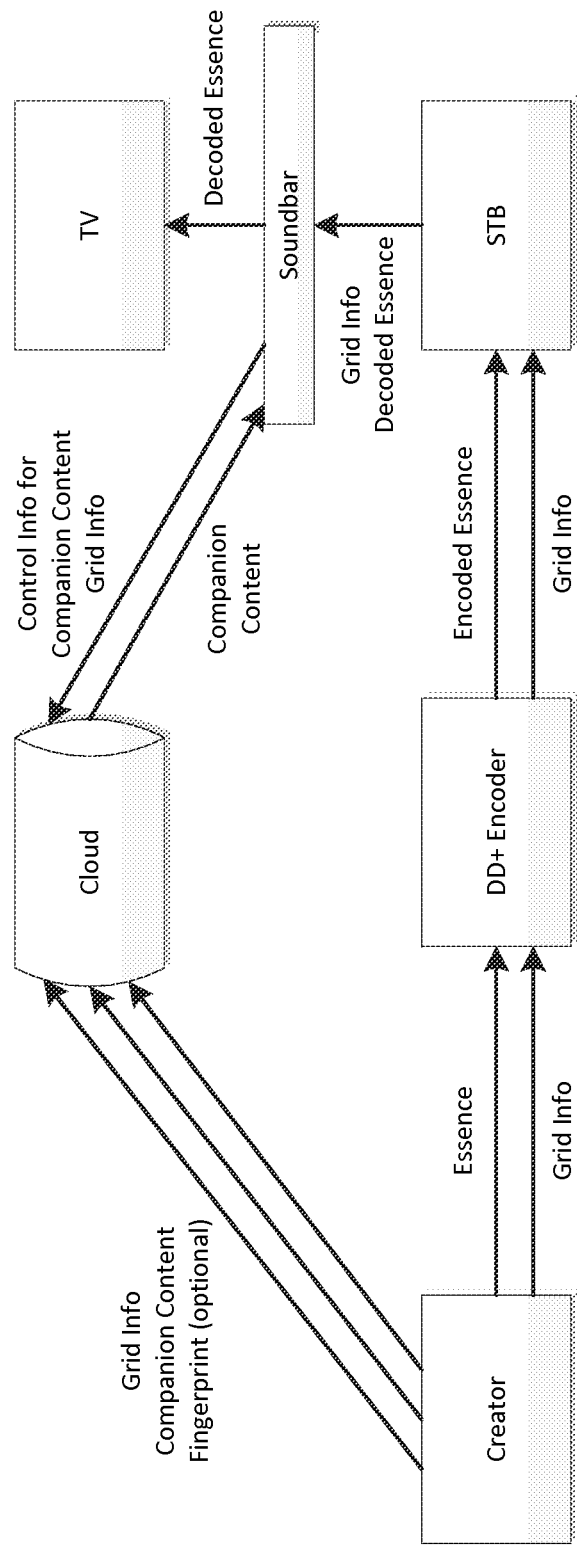

FIG. 3A illustrates example components involved in enabling delivery and synchronization of auxiliary content associated with multimedia data in user experience scenario (4) that are the same as those components involved in user experience scenario (1). In FIG. 3A, a media device denoted as "STB" ("set top box") is used instead of a media device denoted "smart player" in FIG. 2. The STB refers to an endpoint user device for receiving cable broadcast signals. Alternative configurations related to a STB are illustrated in FIG. 3B, FIG. 3C and FIG. 3D, which show how the STB connects with a television, remote, sound device, companion application, etc.

In the configurations as illustrated by FIG. 3A through FIG. 3D, the grid information is created by a creator system, and successfully passed through to other components without data loss affecting the grid info. In these embodiments, automatic content recognition (ACR) techniques such as those based on media fingerprints are not required.

6. Handling Data Loss Affecting Grid Info

However, there are situations where grid info (indeed all metadata) as described herein is lost between a creator system and a media encoding system (e.g., one with a broadcast emission codec, a stream encoding system, a transcoder, etc.). To deal with these situations, alternative solutions can be used, at least some of which involve using ACR techniques. The advantage provided by the use of ACR techniques is that auxiliary content such as annotated companion content and other auxiliary data may be delivered to a media device and/or companion devices/applications even with data loss directly or indirectly affecting the grid info delivery to the media device and/or companion devices/applications.

Figure 4A:
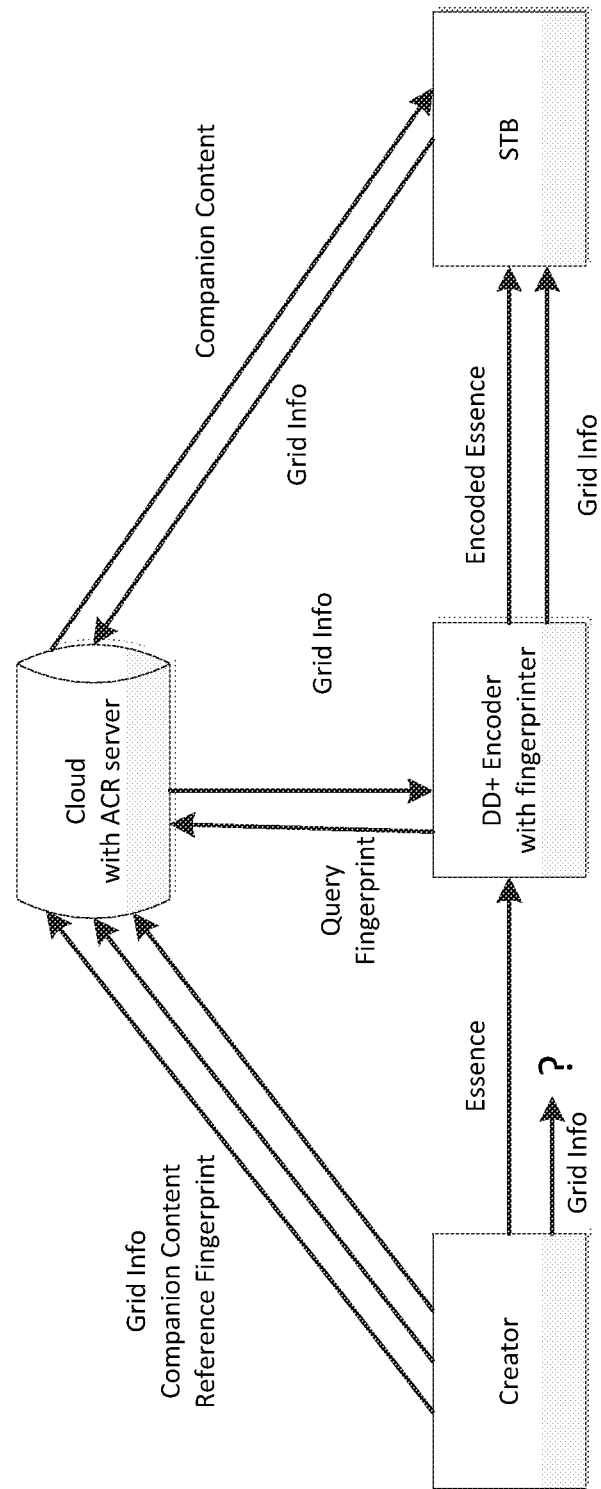
FIG. 4A through FIG. 4E illustrate additional example configurations in enabling delivery and synchronization of auxiliary content associated with multimedia data.

FIG. 4A illustrates an example configuration in which a media data encoder (e.g., a DD+ encoder, etc.) with fingerprinter functionality can use fingerprint query to restore grid info. This configuration can be used in place of, or in conjunction with, the configuration, as illustrated in FIG. 3A. For example, when the media data encoder does not receive the grid info, the media data encoder can be configured to use its fingerprinter functionality to generate fingerprints using essence a media program and query a cloud based auxiliary content service system with ACR functionality. The cloud based auxiliary content service system can identify a specific media program based on the fingerprints received in the query from the media data encoder, retrieves the grid info of the specific media program, and sends the grid info to the media data encoder in response to the query. As a result, the media data encoder can obtain or recover the grid info.

Figure 4B:
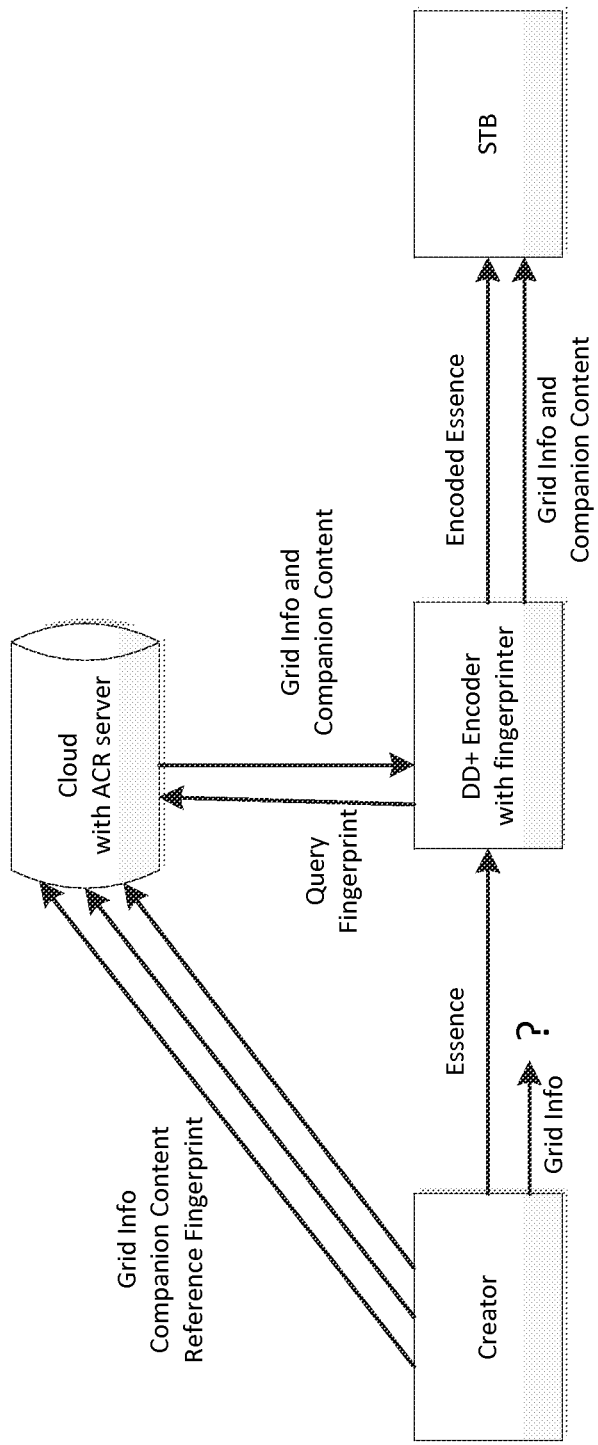

FIG. 4B illustrates another example configuration in which a media data encoder (e.g., a DD+ encoder, etc.) with fingerprinter functionality can use fingerprint query to restore grid info as well as fetch auxiliary content such as annotated companion content and other auxiliary data. This configuration can also be used in place of, or in conjunction with, the configuration, as illustrated in FIG. 3A. In addition to the grid info as illustrated with FIG. 4A, in FIG. 4B, the cloud based auxiliary content service system can be further configured to retrieve the annotated auxiliary content of the specific media program, and to send the grid info and the annotated auxiliary content to the media data encoder in response to a query with fingerprints from the media data encoder. In response, the media data encoder sends the encoded essence of the media program, the grid info and the annotated auxiliary content to the STB.

Figure 4C:
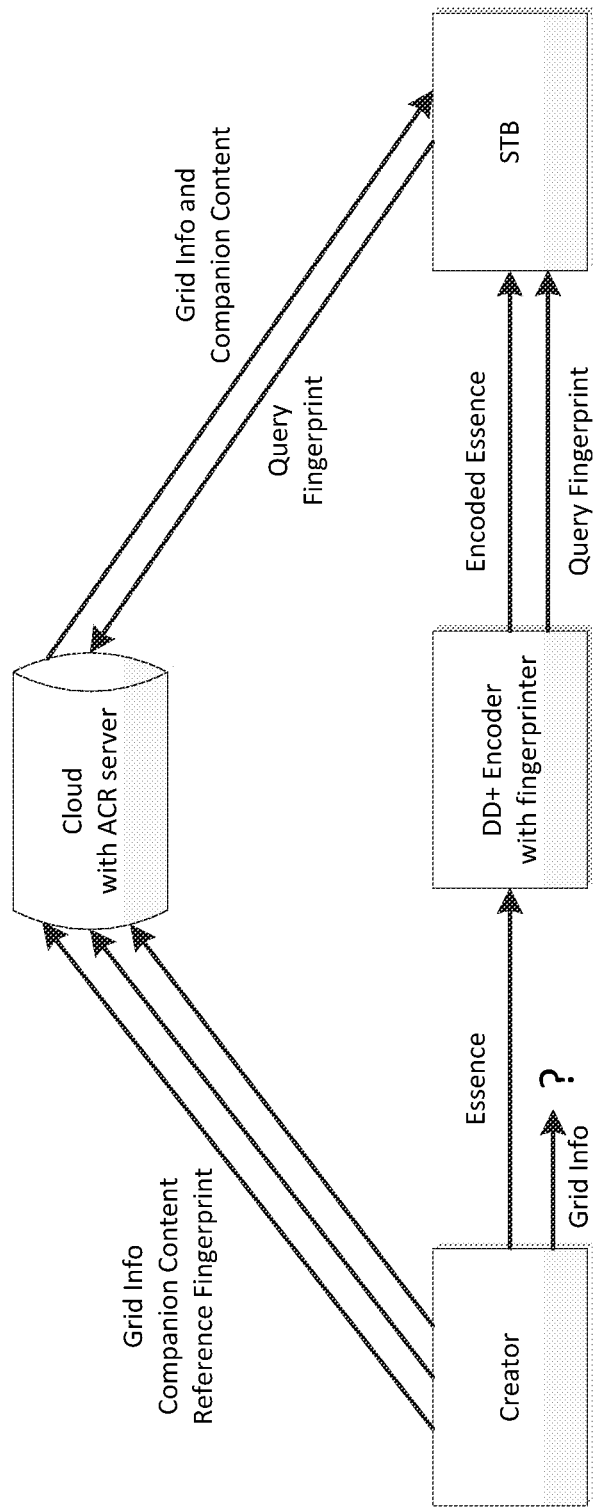

FIG. 4C illustrates an example configuration in which a media data encoder (e.g., a DD+ encoder, etc.) with fingerprinter functionality can send fingerprints to a STB for the purpose of retrieving grid info as well as fetching auxiliary content such as annotated companion content and other auxiliary data from a cloud based auxiliary content service system. The configuration of FIG. 4C is similar to that of FIG. 4B. However, instead of the media data encoder sending the fingerprint-based query with query fingerprints to the cloud based auxiliary content service system, the STB uses the fingerprints received from the media data encoder to send the fingerprint-based query to the cloud based auxiliary content service system. In response, the cloud based auxiliary content service system retrieves the grid info and the annotated auxiliary content of the specific media program, and sends the grid info and the annotated auxiliary content to the STB in response to the fingerprint-based query from the STB.

Figure 4D:
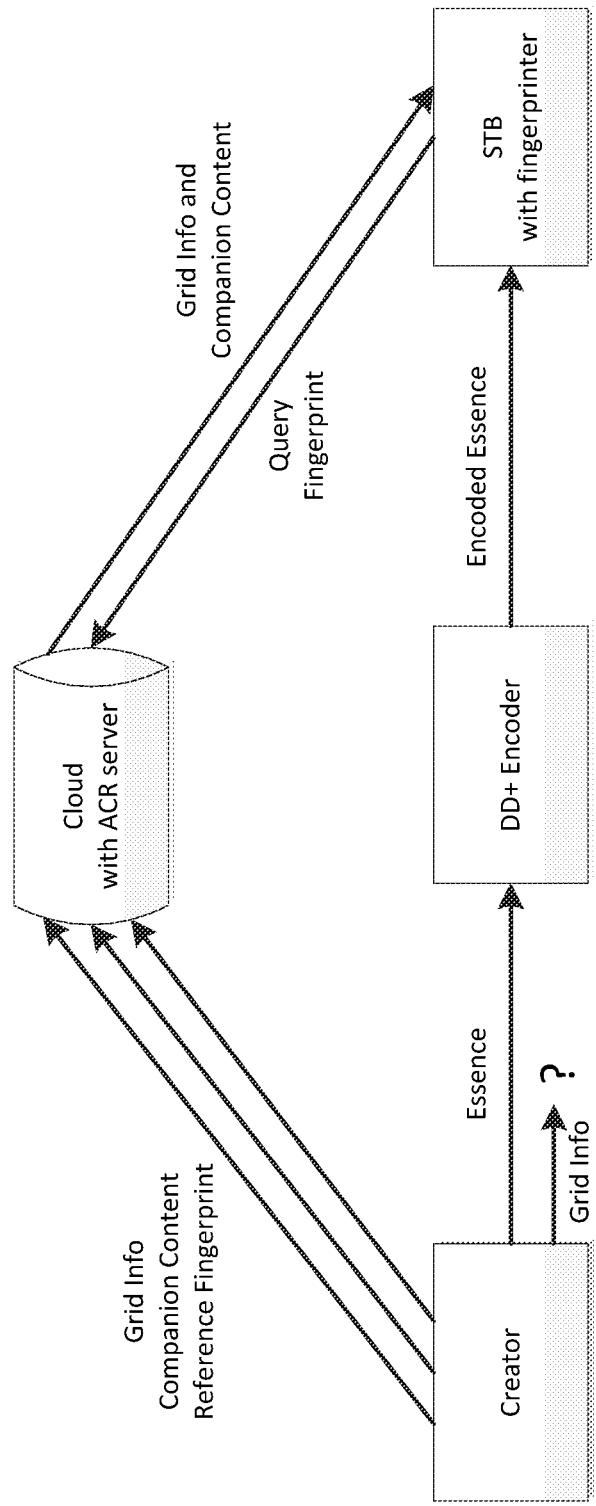

FIG. 4D illustrates an example configuration in which a STB with fingerprinter functionality can generate query fingerprints and send a query with the query fingerprints to a S retrieving grid info as well as fetching auxiliary content such as annotated companion content and other auxiliary data from a cloud based auxiliary content service system.

The configuration of FIG. 4D is similar to that of FIG. 4C. However, instead of receiving query fingerprints from the media data encoder, the STB itself generates the query fingerprint. This is advantageous in some scenarios, as STBs may be upgraded relatively easily as compared with, for example, an emission encoder used by a media data encoder such as a broadcaster system.

7. "After the Fact" Companion Content Creation

Grid info and auxiliary content of a media program as described herein may, but is not required to, be created at the same time when essence of the media program is created.

Figure 4E:
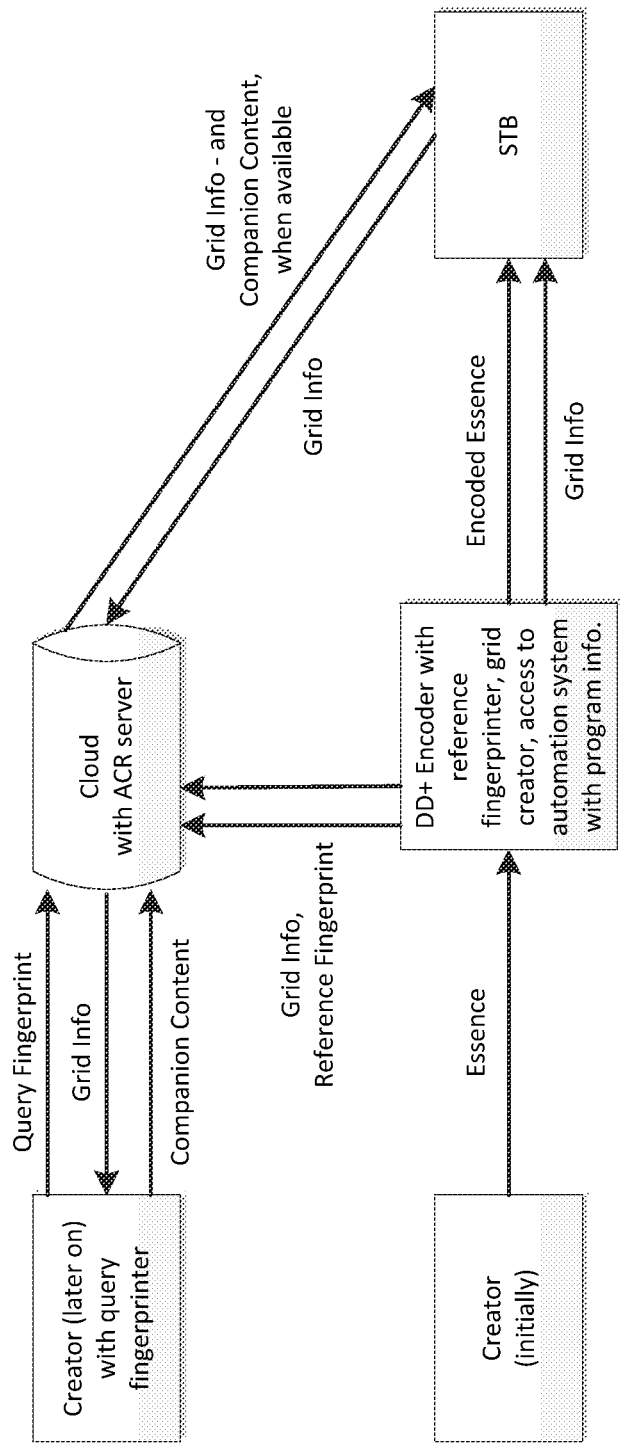

FIG. 4E illustrates an example configuration in which a media data encoder such as a DD+ encoder, etc., creates the grid info and reference fingerprints of a media program when the media data encoder receives essence of the media program, for example, from a creator system of the essence of the media program. In some embodiments, the media data encoder can be configured with reference fingerprint functionality to generate reference fingerprints for media programs from media content of media programs, grid creator functionality to generate grid info of a media program based on essence of the media program, with other functionality to generate an EVID for a media program by accessing an automation system with program information of the media program, etc.

In some embodiments, the media data encoder sends the grid info and the reference fingerprints to a cloud based auxiliary content service system for storage, and to a downstream recipient such as a media player, a STB, etc. If annotated companion content has not been created and stored with the cloud based auxiliary content service system, the STB uses the grid info to query the cloud based auxiliary content service system may not be able to retrieve any companion content corresponding to the grid info of the media program.

However, after a later creator system (which may or may not be the same as the creator system of the essence of the media program) generates query fingerprints from the essence of the media program and obtain the grid info from the cloud based auxiliary content service system, the later creator can provide annotated companion content and other auxiliary data, all time-wise corresponding to the grid info of the media program, to the cloud based auxiliary content service system. Subsequently, an STB can query the cloud based auxiliary content service system with the grid info received from the media data encoder, and receive the annotated companion content and other auxiliary data from the cloud based auxiliary content service system.

Techniques as described herein can also be used to support in-band companion content delivery. For example, in place of, or in conjunction with sending time-based metadata (e.g., external_data, etc.) including grid info to fetch cloud-based companion content, a media data signal (e.g., a media data signal implementing the Dolby® Evolution framework commercially developed by Dolby Laboratories, Inc., San Francisco, Calif., etc.) can be used to send some or all of the companion content of a media program along with essence of the media program. Similar configurations for time alignment and content authoring, as previously discussed, can be used for the in-band companion content delivery. For example, some or all of the companion content can just be delivered as separate payloads.

In some embodiments, annotated companion content as described herein can be used to replace at least a portion of essence of a media program. In an example, the annotated companion content may comprise audio content to replace all of the original audio content in the media program. For example, the annotated companion content may comprise an audio mix with audio objects (e.g., immersive audio including audio objects and channel beds, etc.), a user-controlled set of optional objects, etc. In another example, the annotated companion content may comprise dialog objects of one natural language that can be used to replace only the dialogue objects of another natural language, for example, program-wide.

In some embodiments, annotated companion content as described herein can be used as additional data to the original audio of a media program. For example, additional data to backwards-compatible essence (e.g., audio essence that is compatible with a 5.1 audio channel configuration, etc.) of the media program may be received as annotated companion content and added to or with the backwards-compatible essence by a smart player with a relatively updated decoder to combine the additional data and the essence to achieve an immersive audio including audio objects and channel beds that can use other audio channel configurations some of which may be more complex than the audio channel configuration supported by the backwards-compatible essence of the media program. The addition or combination of the annotated companion content can utilize the synchronization capabilities as described herein.

8. Customized Companion Content

Figure 5A:
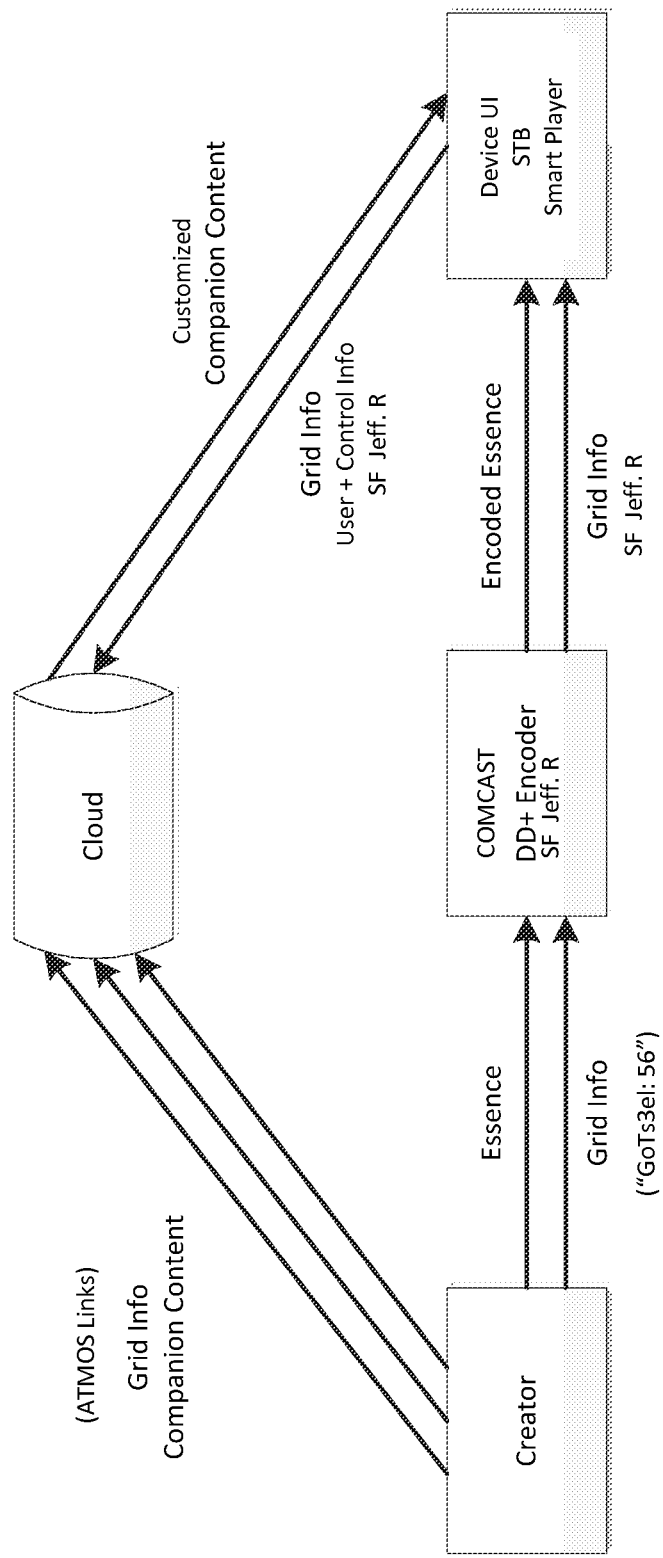
FIG. 5 A and FIG. 5B illustrates example delivery of customized auxiliary content.
Figure 5B:
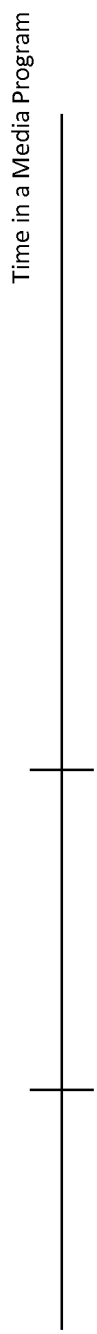

In some embodiments, techniques as described herein can be used to provide customized companion content to a user. FIG. 5A illustrates example components involved in enabling delivery and synchronization of customized auxiliary content associated with multimedia data. The configuration of FIG. 5A is similar to that of FIG. 3A. In FIG. 5A, one or more customized companion content items (e.g., denoted as "immersive audio links," etc.) that are customized to a specific user, a group of users such as in a postal code area, audience in a specific network, audience in a specific geographic location, audience sharing one or more specific interests, etc., may be provided by the creator system to the cloud based auxiliary content service system. Grid info may represent a time grid as illustrated in FIG. 5B (e.g., each grid point can be used to generate a URL for a resource or content item in the cloud, etc.) and include a specific time (e.g., "GoTs3e1:56" where "GoTs3e1" may a shortened string for a media program of a specific episode of "Game of Thrones s3e1", etc.) in a media program at which the one or more customized companion content items are to be shown. The grid info is transmitted from the creator system to the media encoding system (denoted as "Comcast DD+ Encoder," which may be transcoder, etc.) and further to one or more media devices such as one or more of STBs, smart players, etc. Some or all of these media devices may comprise media device UIs for the purpose of accessing and/or interacting with essence of the media program and/or the customized companion content if available. The media encoding system may comprise identifying information (e.g., a user ID, a subscriber ID, a postal code, etc.) for one or more recipients (denoted as "SF Jeff R.") to which the media data signal with encoded essence and grid info is sent. In some embodiments, the one or more media devices may send a query, to the cloud based auxiliary content service system, with a URL (e.g., "https://secure.dolbycloud.net/GoTs3e1:56", etc.) constructed from the portion of grid information identifying the specific time point (in the present example, "GoTs3e1:56"), user and control information including information identifying a specific recipient (in the present example, "SF Jeff R."), a specific recipient group, etc. Upon receiving the query, the cloud based auxiliary content service system can fetch the one or more customized companion content items (in the present example, "immersive audio links") and return the one or more customized companion content items to the one or more media devices.

In some embodiments, one or more systems other than a creator system can be configured to insert/provide auxiliary content data to a cloud based auxiliary content service system. For example, a broadcaster can insert/provide auxiliary content data and/or related data to the cloud based auxiliary content service system. In some embodiments, a content creator initially creates grid info for a media program, for example, "I'm HBO showing Game of Thrones s3e1." Then, a distributor (e.g., "Comcast", etc.) can insert its own information into the grid info such as "Comcast showing this original airing at 8 pm," etc. This added information can be part of one or more existing data items such as those related to "version" in the grid info or alternatively can be placed with one or more new or separate data items. Thus, a distributor (e.g., Comcast, etc.) can specify "which airing" (e.g., which stream, etc.) of a media program, not just who the sender is (Comcast). In some embodiments, different users can be provided with different EVIDs for the same essence of the media program. Companion content items can be customized for a specific user through a specific EVID that distinguishes the specific user from other users that get the same essence of the media program. For example, a distributor can edit the EVID of the essence of the media program to make the EVID specific to one or more users. Similarly, different users may be provided with different URLs, as described under "time based metadata" above.

In some embodiments, a creator, a broadcaster, etc., can classify/identify a specific media content item into an overall media program. For example, a Burger King ad that is to be shown during an episode of Friends can be specified as a part of the episode of Friends by a broadcaster after a creator has specified the ad as "a Burger King ad." In some embodiments, a creator's system as described herein may directly insert grid information within media data containers, media metadata containers, etc., comprising audio samples and/or image pixel information in any of a variety of encoding formats such as Dolby ED2, AC-4, DD+, etc. Additionally, optionally, or alternatively, a creator's system (e.g., a transcoder, an encoder, a media streaming system, etc.) as described herein may independently generate grid information associated/linked with media data containers, media metadata containers, etc., comprising audio samples and/or image pixel information (e.g., the grid information is provided in an index file separately from but associated with the media data containers, etc.) in any of a variety of encoding formats such as linear pulse-code modulation (LPCM), Dolby ED2, AC-4, DD+, etc. In some embodiments, a media encoding system as described herein (e.g., in FIG. 3A through FIG. 3D, a transcoder, etc.) may comprise a transcoder, for example configured for transcoding from a first encoding format such as Dolby ED2, etc., to a second encoding format such as Dolby Digital Plus (DD+), etc. In various embodiments, grid information as described herein can be encoded into any formats, such as TrueHD, AC-4, an encoding format that may become available, etc. Thus, under techniques as described herein, various encoding formats could be used to deliver essence of a media program and grid information comprising a sequence of time points over the media program from a creator of the essence of the media program to a downstream recipient media encoder such as a DD+ encoder, etc. Under techniques as described herein, the grid information can be transcoded along with transcoding the essence. Some or all of the time points represented by pre-transcoded grid information may be continually represented by post-transcoded grid information. In a particular embodiment, all the time points represented by the pre-transcoded grid in a pre-transcoded media stream encoded in a first encoding format such as Dolby ED2, etc., are converted and preserved, without loss, to the post-transcoded grid information in a post-transcoded media stream encoded in a second encoding format such as DD+, etc.

For the purpose of illustration only, an auxiliary content service system has been described as cloud based. It should be noted that an auxiliary content service system does not have to be cloud based. In some embodiments, such an auxiliary content service system can be premise-based, for example, with a broadcaster, rather than cloud based.

9. Other Services and Interfaces

Some or all user experience scenarios as described herein may be monetized in a variety of ways. For example, techniques as described herein can operate with an interface (e.g., a user interface implemented locally and/or remotely with respect to a media device, etc.) or a service (e.g., a user accessible service implemented locally and/or remotely with respect to a media device, etc.) that offers annotated auxiliary content with media programs. When a user selects a media program or media content for subscription-based viewing (e.g. cable TV, etc.), on-demand rental or purchase, the user can be given an option to include alternative media content, annotated companion content, etc., for a fee. In some embodiments, even though the media program as broadcast or downloaded may not include the alternative media content, annotated companion content, etc., the grid information may be provided with the media program so that the alternative media content, annotated companion content, etc., can be readily fetched (e.g., upon the user's request). In some embodiments, the interface or service may be implemented at least partially on a media device such as a smart player, a STB, etc.

In some embodiments, the interface as described herein can be implemented in an audio video receiver (AVR), a sound playback device, etc. An AVR, a soundbar, or a display device such as a TV, etc., may be configured to detect that alternative media data, annotated companion content such as alternative audio, etc., is available. The grid info as described herein can be used by a connected playback device to fetch such alternative media data, annotated companion content such as alternative audio, etc. In some embodiments, a user interface on one or more of the AVR, soundbar, or a display device such as a TV, etc., can be configured to allow the user to make a purchase for such content.

10. Example Process Flows

Figure 7A:
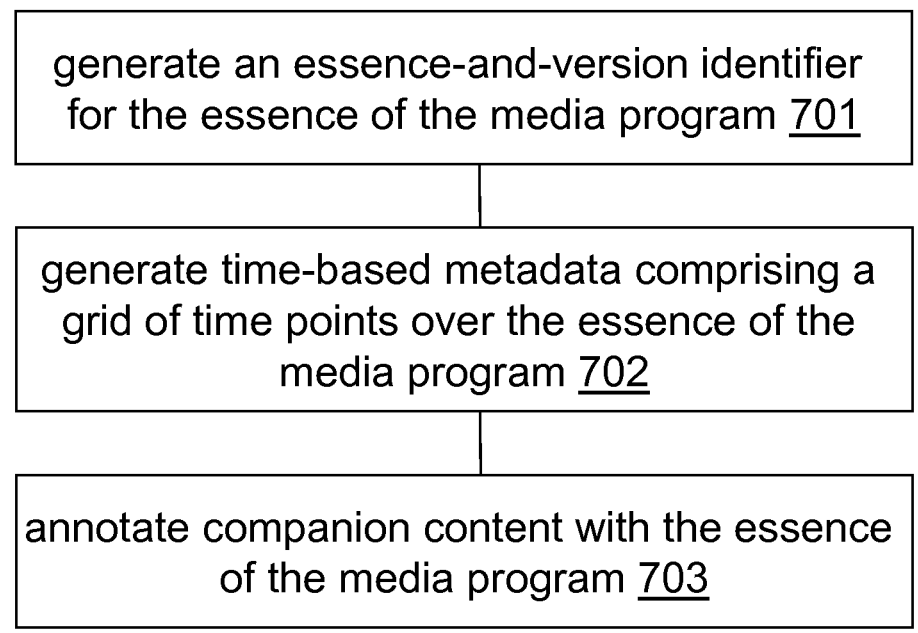

FIG. 7A and FIG. 7H illustrate example process flows. In some embodiments, one or more computing devices or units may perform this process flow.

FIG. 7A illustrates an example process flow that may be implemented by a media system (or device) as described herein. In block 701 of FIG. 7A, the media system (e.g., an auxiliary content creation system, etc.) generates, based on program information about essence of a media program, an essence-and-version identifier for the essence of the media program.

In block 702, based on the essence of the media program, a reference clock and the essence-and-version identifier, the media system generates time-based metadata comprising a grid of time points over the essence of the media program.

In block 703, the media system correlates companion content with the grid of time points over the essence of the media program by linking one or more companion content items in the companion content to one or more time points in the grid of time points over the essence of the media program.

In an embodiment, the one or more companion content items comprises at least one companion content item designated to be received by one or more specific recipients.

In an embodiment, the one or more companion content items comprises at least one companion content item designated to be sent for one or more specific senders.

In an embodiment, the media system is further configured to send the companion content to an auxiliary content server.

In an embodiment, the media system is further configured to output the essence of the media program and the time-based metadata to one or more of broadcasters, streaming servers, media encoding systems, media transcoding systems, etc.

In an embodiment, the media system is further configured to prevent the one or more companion content items in the companion content that are linked to the one or more time points in the grid of time points from being outputted to the one or more of broadcasters, streaming servers, media encoding systems, media transcoding systems, etc., with the essence of the media program and the time-based metadata.

In an embodiment, the media system is further configured to output at least one of the one or more companion content items in the companion content that are linked to the one or more time points in the grid of time points to the one or more of broadcasters, streaming servers, media encoding systems, media transcoding systems, etc., with the essence of the media program and the time-based metadata.

Figure 7B:
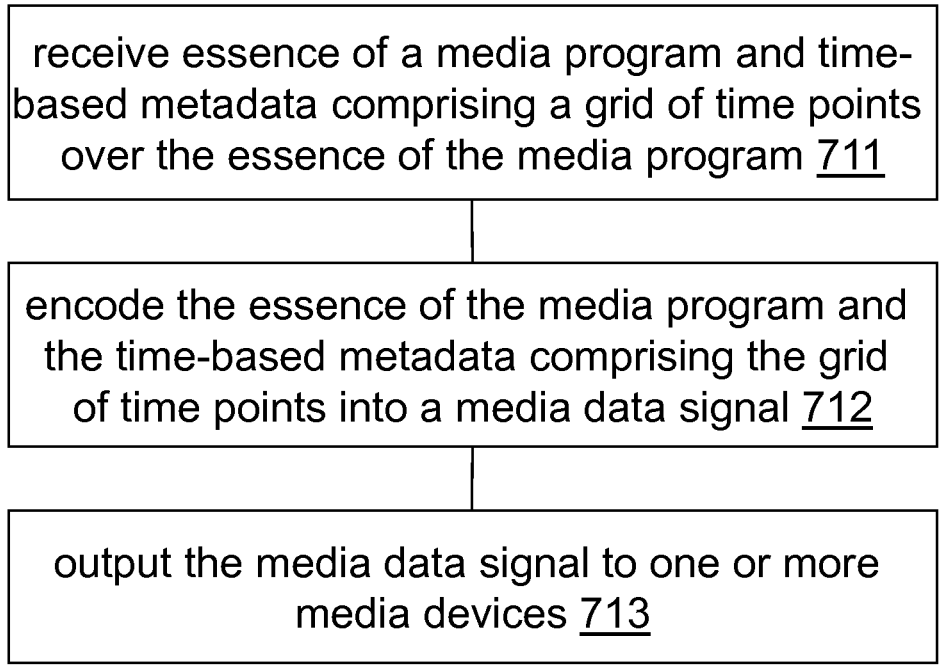

FIG. 7B illustrates an example process flow that may be implemented by a media system (or device) as described herein. In block 711 of FIG. 7B, the media system (e.g., a broadcaster, a media streaming server, a media encoding system, etc.) receives essence of a media program and time-based metadata comprising a grid of time points over the essence of the media program, the time-based metadata being generated by an upstream companion content creator system based on the essence of the media program, a reference clock and an essence-and-version identifier of the media program, the essence-and-version identifier being generated, based on program information about the essence of the media program.

In block 712, the media system encodes the essence of the media program and the time-based metadata comprising the grid of time points into a media data signal, the time-based metadata being transmitted in a specific metadata portion of the media data signal.

In block 713, the media system outputs the media data signal to one or more media devices.

In an embodiment, the media system is further configured to perform: determining a recipient identifier for one or more recipients to which the media data signal is to be sent; encoding the recipient identifier into the media data signal; etc.

In an embodiment, the media system is further configured to encode a sender identifier into the media data signal.

In an embodiment, the media system is further configured to perform: receiving, from a media content server, essence of a second media program, without receiving second time-based metadata of a second grid of time points over the essence of the second media program from the media server; generating, based on the essence of the second media program, a set of query fingerprints; sending, to an auxiliary content server, one or more requests for the second time-based metadata, the one or more requests including the set of query fingerprints; receiving, from the auxiliary content server, the second time-based metadata of the second grid of time points over the essence of the second media program in one or more responses to the one or more requests; encoding the essence of the second media program and the second time-based metadata comprising the second grid of time points into a second media data signal, the second time-based metadata being transmitted in a second specific metadata portion of the second media data signal; outputting the second media data signal to one or more media devices; etc.

In an embodiment, second companion content correlated with the second grid of times over the essence of the second media program is received, from the auxiliary content server, along with the second time-based metadata; and the second companion content is encoded into the second media data signal with the essence of the second media program and the second time-based metadata.

In an embodiment, the media system is further configured to perform: receiving, from a media content server, essence of a second media program, without receiving second time-based metadata of a second grid of time points over the essence of the second media program from the media server; generating, based on the essence of the second media program, a set of query fingerprints; encoding the essence of the second media program and the set of query fingerprints into a second media data signal, the second set of query fingerprints being transmitted in a second specific metadata portion of the second media data signal; outputting the second media data signal to one or more media devices; etc.

In an embodiment, one or more data items for a specific time point in the grid of time points are serialized over a plurality of media data frames.

In an embodiment, the specific metadata portion of the media data signal comprises one or more data items for a specific time point in the grid of time points that represents a specific location of the essence of the media program, the one or more data items identifying an auxiliary content server from which a specific companion content item linked to the specific time point is to be retrieved.

In an embodiment, the one or more data items comprises resource location information for generating at least one universal resource locator in reference to the auxiliary content server.

In an embodiment, the media data signal is streamed to at least one of the one or more media devices.

In an embodiment, the media data signal is broadcast to at least one of the one or more media devices.

FIG. 7C illustrates an example process flow that may be implemented by a media system (or device) as described herein. In block 721 of FIG. 7C, the media system (e.g., a smart player, a set-top box, etc.) decodes a media data signal into essence of a media program and time-based metadata comprising a grid of time points over the essence of the media program, the time-based metadata being received in a specific metadata portion of the media data signal, the time-based metadata being generated by an upstream companion content creator system based on the essence of the media program, a reference clock and an essence-and-version identifier of the media program, the essence-and-version identifier being generated, based on program information about the essence of the media program.

In block 722, the media system receives, from the specific metadata portion of the media data signal, one or more data items for a specific time point in the grid of time points that represents a specific location of the essence of the media program, the one or more data items identifying an auxiliary content server from which a specific companion content item linked to the specific time point is to be accessed.

In block 722, based on resource location information in the one or more data items comprises, the media system generates at least one universal resource locator in reference to the auxiliary content server.

In an embodiment, one or more data items include a recipient identifier, and the at least one universal resource locator comprises user information generated based at least in part on the recipient identifier.

In an embodiment, one or more data items include a sender identifier, and the at least one universal resource locator comprises control information generated based at least in part on the sender identifier.

In an embodiment, the media system is further configured to perform: receiving essence of a second media program and a set of query fingerprints generated based on the essence of the second media program, without receiving second time-based metadata of a second grid of time points over the essence of the second media program from the media server; sending, to an auxiliary content server, one or more requests for the second time-based metadata and companion content correlated with the second grid of times over the essence of the second media program, the one or more requests including the set of query fingerprints; receiving, from the auxiliary content server, the second time-based metadata of the second grid of time points over the essence of the second media program in one or more responses to the one or more requests and the companion content correlated with the second grid of times over the essence of the second media program; etc.

In an embodiment, the media system is further configured to perform: receiving essence of a second media program, without receiving second time-based metadata of a second grid of time points over the essence of the second media program from the media server; generating, based on the essence of the second media program, a set of query fingerprints; sending, to an auxiliary content server, one or more requests for the second time-based metadata and companion content correlated with the second grid of times over the essence of the second media program, the one or more requests including the set of query fingerprints; receiving, from the auxiliary content server, the second time-based metadata of the second grid of time points over the essence of the second media program in one or more responses to the one or more requests and the companion content correlated with the second grid of times over the essence of the second media program; etc.

In an embodiment, the steps of decoding, receiving and generating are performed by a media device concurrently with rendering the essence of the media program with the media device.

In an embodiment, the media system is further configured to display a user control to a user with the media device at the specific time point of the essence of the media program, the user control being selectable by the user to access the specific companion content item linked to the specific time point. In an embodiment, the media device is a smart player with a player application configured to streamed media content from a stream server. In an embodiment, the media device is a broadcast receiver configured to receive broadcast media content from a media broadcast system. In some embodiments, metadata in band with the essence identifies options to show to the user. In some other embodiments, metadata in band with the essence is not sufficient to identify options to show to the user. In these other embodiments, the media system may retrieve grid info that identifies one or more of content identifiers, timing, sender, recipient, URL, etc., and query one or more cloud-based system using the one or more of content identifiers, timing, sender, recipient, URL, etc., for data that identifies options to be presented to the user. The data received from the one or more cloud-based systems can be used to show the user the options, for example, Spanish dialogue, a specific audio mix, etc. In response to receiving user input that selects a particular option (e.g., Spanish dialogue, a specific audio mix, etc.), the media device retrieves specific media content corresponding to the selected option.

In an embodiment, the media system is further configured to perform: receiving user input representing a request for the specific companion content item linked to the specific time point at a media device; accessing, based on the one or more data items, the specific companion content item linked to the specific time point; etc.

In an embodiment, the specific companion content item is rendered at the media device.

In an embodiment, the specific companion content item is rendered at a companion device to the media device.

Figure 7D:
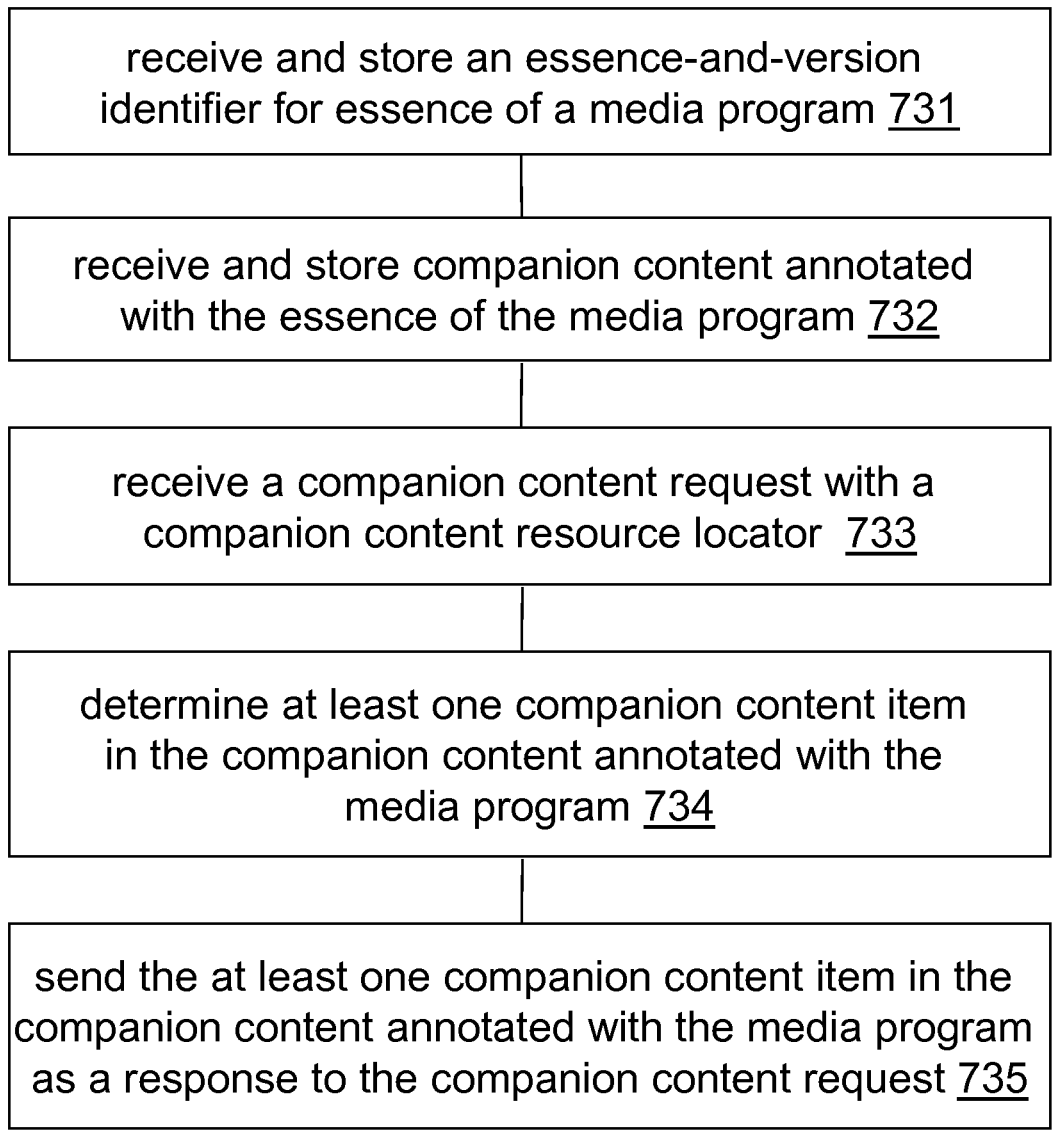

FIG. 7D illustrates an example process flow that may be implemented by a media system (or device) as described herein. In block 731 of FIG. 7D, the media system (e.g., an auxiliary content server, etc.) receives and stores an essence-and-version identifier for essence of a media program, the essence-and-version identifier being generated based on program information about essence of a media program.

In block 732, the media system receives and stores companion content correlated with a grid of times over the essence of the media program, one or more companion content items in the companion content being linked to one or more time points in the grid of time points over the essence of the media program.

In block 733, the media system receives, from a companion content client device, a companion content request with a companion content resource locator that is created based in part on at least one of the one or more time points in the grid of time points and the essence-and-version identifier for the essence of the media program.

In block 734, in response to receiving the companion content request with the companion content resource locator, the media system determines, based on the resource locator, at least one of the one or more companion content items in the companion content correlated with the grid of times over the essence of the media program.

In block 735, the media system sends, to the companion content client device, the at least one of the one or more companion content items in the companion content correlated with the second grid of times over the essence of the media program as a response to the companion content request.

In an embodiment, the companion content resource locator comprises user information generated based at least in part on a recipient identifier, and the at least one of the one or more companion content items in the companion content correlated with the second grid of times over the essence of the media program is selected based at least in part on the recipient identifier.

In an embodiment, the companion content resource locator comprises control information generated based at least in part on a sender identifier, and the at least one of the one or more companion content items in the companion content correlated with the second grid of times over the essence of the media program is selected based at least in part on the sender identifier.

In an embodiment, the media system is further configured to perform: receiving, from a media encoding system, one or more requests for second time-based metadata of a second grid of time points over essence of a second media program, the one or more requests including a set of query fingerprints generated based on the essence of the second media program; retrieving, based at least in part on the set of query fingerprints, the second time-based metadata; sending, to the media encoding system, the second time-based metadata of the second grid of time points over the essence of the second media program in one or more responses to the one or more requests; etc.

In an embodiment, second companion content correlated with the second grid of times over the essence of the second media program is sent, to the media encoding system, along with the second time-based metadata.

In an embodiment, the media system is further configured to perform: receiving, from the media device, one or more requests for second time-based metadata of a second grid of time points over essence of a second media program, the one or more requests including a set of query fingerprints generated based on the essence of the second media program; retrieving, based at least in part on the set of query fingerprints, the second time-based metadata and second companion content correlated with the second grid of times over the essence of the second media program; sending, to the media device, the second time-based metadata of the second grid of time points over the essence of the second media program and the second companion content correlated with the second grid of times over the essence of the second media program in one or more responses to the one or more requests; etc.

In an embodiment, each of the one or more companion content items in the companion content is indexed by a corresponding time point in the one or more time points in the grid of time points over the essence of the media program.

In an embodiment, the companion content client device is one of a media broadcast server, a media streaming server, a media device, or a companion device to a media device.

Figure 7E:
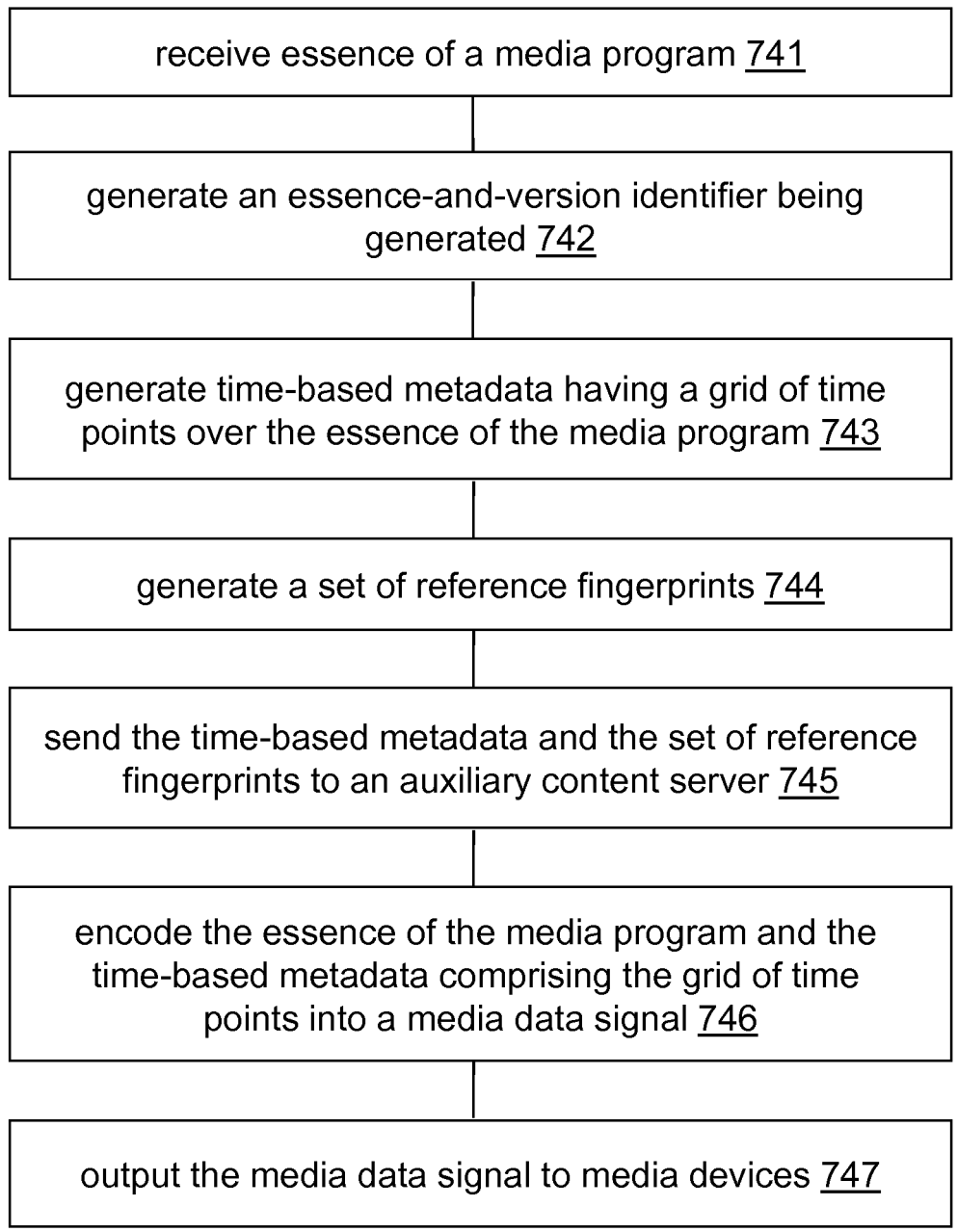

FIG. 7E illustrates an example process flow that may be implemented by a media system (or device) as described herein. In block 741 of FIG. 7E, the media system (e.g., a broadcaster, a media streaming server, a media encoding system, etc.) receives essence of a media program.

In block 742, the media system generates, based on program information about the essence of the media program, an essence-and-version identifier being generated.

In block 743, the media system generates, based at least in part on the essence of the media program, a reference clock and the essence-and-version identifier of the media program, time-based metadata comprising a grid of time points over the essence of the media program.

In block 744, the media system generates, based on the essence of the media program, a set of reference fingerprints.

In block 745, the media system sends the time-based metadata and the set of reference fingerprints to an auxiliary content server.

In block 746, the media system encodes the essence of the media program and the time-based metadata comprising the grid of time points into a media data signal, the time-based metadata being transmitted in a specific metadata portion of the media data signal.

In block 747, the media system outputs the media data signal to one or more media devices.

Figure 7F:
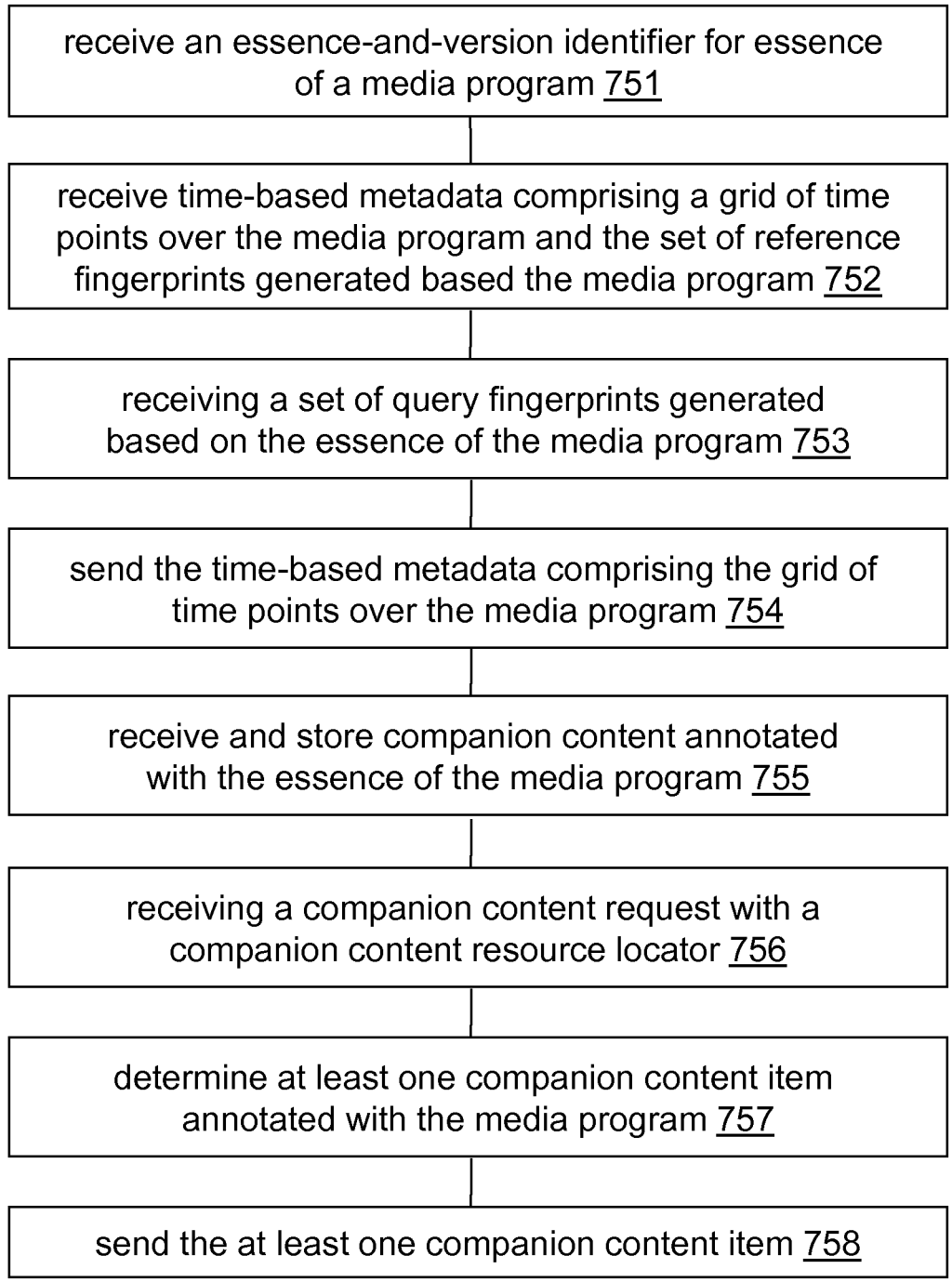

FIG. 7F illustrates an example process flow that may be implemented by a media system (or device) as described herein. In block 751 of FIG. 7F, the media system (e.g., a broadcaster, a media streaming server, a media encoding system, a transcoder, etc.) receives, from a media encoding system, an essence-and-version identifier for essence of a media program, the essence-and-version identifier being generated based on program information about essence of a media program.

In block 752, the media system receives, from the media encoding system, time-based metadata comprising a grid of time points over the essence of the media program and the set of reference fingerprints generated based on the essence of the media program.

In block 753, the media system receives, from an auxiliary content creator, a set of query fingerprints generated based on the essence of the media program.

In block 754, in response to receiving the set of query fingerprints, the media system sends, to the auxiliary content creator, the time-based metadata comprising the grid of time points over the essence of the media program.

In block 755, the media system receives and stores companion content correlated with a grid of times over the essence of the media program, one or more companion content items in the companion content being linked to one or more time points in the grid of time points over the essence of the media program;

In block 756, the media system receives, from a companion content client device, a companion content request with a companion content resource locator that is created based in part on at least one of the one or more time points in the grid of time points and the essence-and-version identifier for the essence of the media program.

In block 757, in response to receiving the companion content request with the companion content resource locator, the media system determines, based on the resource locator, at least one of the one or more companion content items in the companion content correlated with the grid of times over the essence of the media program;

In block 758, the media system sends, to the companion content client device, the at least one of the one or more companion content items in the companion content correlated with the grid of times over the essence of the media program as a response to the companion content request.

FIG. 7G illustrates an example process flow that may be implemented by a media system (or device) as described herein. In block 761 of FIG. 7G, the media system (e.g., an annotator, etc.) sends, to an auxiliary content server, a set of query fingerprints generated based on essence of a media program.

In block 762, the media system receives, from the auxiliary content server, time-based metadata comprising a grid of time points over the essence of the media program.

In block 763, the media system sends, to the auxiliary content server, companion content correlated with the grid of times over the essence of the media program, one or more companion content items in the companion content being linked to one or more time points in a grid of time points over the essence of the media program.

FIG. 7H illustrates an example process flow that may be implemented by a media system (or device) as described herein. In block 771 of FIG. 7H, the media system (e.g., a smart player, a set-top box, etc.) decodes a media data signal into essence of a media program;

In block 772, based on the essence of the media program, the media system generates a set of one or more query fingerprints.

In block 773, the media system sends, to an auxiliary content server, a request for auxiliary content, the request including the set of one or more query fingerprints.

In block 774, the media system receives one or more auxiliary content items and time-based metadata comprising a grid of time points over the essence of the media program, the time-based metadata being generated by an upstream companion content creator system based on the essence of the media program, a reference clock and an essence-and-version identifier of the media program, the essence-and-version identifier being generated, based on program information about the essence of the media program. In some embodiments, the auxiliary content items and the time-based metadata may arrive at the same time. In some embodiments, the auxiliary content items and the time-based metadata may arrive at different times, for example, sequentially, with partial overlapping, etc. For example, the grid of time points in the time-based metadata may be obtained first, and can be used to query cloud-based systems to see what companion content is available, e.g. a Spanish language mix. In some embodiments, user input can also be solicited so that a user can choose what companion content (e.g., among several options of companion content, etc.) is to be obtained. In response to receiving user input that selects a particular option of companion content, the media system retrieves the selected companion content from the cloud-based systems.

In some embodiments, process flows involving operations, methods, etc., as described herein can be performed through one or more computing devices or units.

In an embodiment, an apparatus comprises a processor and is configured to perform any of these operations, methods, process flows, etc.

In an embodiment, a non-transitory computer readable storage medium, storing software instructions, which when executed by one or more processors cause performance of any of these operations, methods, process flows, etc.

In an embodiment, a computing device comprising one or more processors and one or more storage media storing a set of instructions which, when executed by the one or more processors, cause performance of any of these operations, methods, process flows, etc. Note that, although separate embodiments are discussed herein, any combination of embodiments and/or partial embodiments discussed herein may be combined to form further embodiments.

11. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
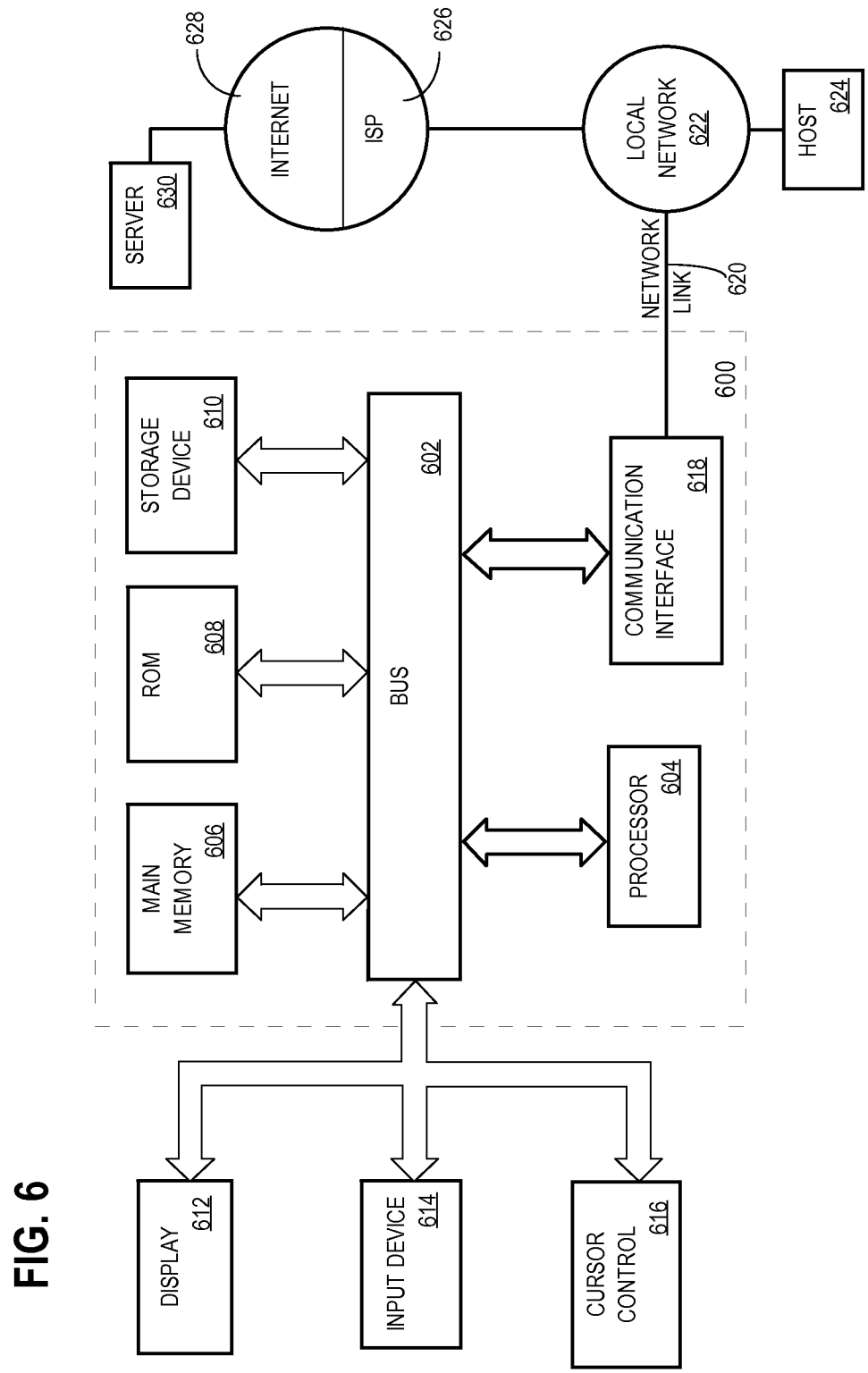
FIG. 6 illustrates an example hardware platform on which a computer or a computing device as described herein may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a liquid crystal display, for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques as described herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hardwired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

12. Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
generating, based on program information about essence of a media program, an essence-and-version identifier for the essence of the media program;
based on the essence of the media program, a reference clock and the essence-and-version identifier, generating time-based metadata comprising a grid of time points over the essence of the media program;
correlating one or more cloud-based companion content items with one or more time points in the grid of time points over the essence of the media program by linking one or more companion content items in the companion content to one or more time points in the grid of time points over the essence of the media program;
causing the essence of the media program and the time-based metadata to be outputted to one or more recipient systems;
wherein the method is performed by one or more computing devices.

2. The method of claim 1, further comprising sending the companion content to an auxiliary content server.

3. The method of claim 1, further comprising outputting the essence of the media program and the time-based metadata to one or more of broadcasters, streaming servers, media encoding systems, or media transcoding systems.

4. The method of claim 3, further comprising preventing the one or more companion content items in the companion content that are linked to the one or more time points in the grid of time points from being outputted to the one or more of broadcasters, streaming servers, media encoding systems, or media transcoding systems, with the essence of the media program and the time-based metadata.

5. The method of claim 3, further comprising outputting at least one of the one or more companion content items in the companion content that are linked to the one or more time points in the grid of time points to the one or more of broadcasters, streaming servers, media encoding systems, or media transcoding systems, with the essence of the media program and the time-based metadata.

6. A method comprising:
receiving, from a media content server, essence of a media program, without receiving time-based metadata of a grid of time points over the essence of the media program from the media content server;
generating, based on the essence of the media program, a set of query fingerprints;
sending, to an auxiliary content server, one or more requests for the time-based metadata, the one or more requests including the set of query fingerprints;
receiving, from the auxiliary content server, the time-based metadata of the grid of time points over the essence of the media program in one or more responses to the one or more requests;
encoding the essence of the media program and the time-based metadata comprising the grid of time points into a media data signal, the time-based metadata being transmitted in a specific metadata portion of the media data signal;
outputting the media data signal to one or more media devices.

7. The method of claim 6, further comprising:
receiving essence of a second media program and second time-based metadata comprising a second grid of time points over the essence of the second media program, the second time-based metadata being generated by an upstream companion content creator system based on the essence of the second media program, a reference clock and an essence-and-version identifier of the second media program, the essence-and-version identifier being generated, based on program information about the essence of the second media program;
encoding the essence of the second media program and the second time-based metadata comprising the second grid of time points into a second media data signal, the second time-based metadata being transmitted in a second specific metadata portion of the second media data signal;
outputting the second media data signal to one or more media devices.

8. The method of claim 7, further comprising:
determining a recipient identifier for one or more recipients to which the second media data signal is to be sent;
encoding the recipient identifier into the second media data signal.

9. The method of claim 6, wherein the second specific metadata portion of the second media data signal comprises one or more data items for a specific time point in the second grid of time points that represents a specific location of the essence of the second media program, the one or more data items identifying an auxiliary content server from which a specific companion content item linked to the specific time point is to be retrieved.

10. The method of claim 9, wherein the one or more data items comprises resource location information for generating at least one universal resource locator in reference to the auxiliary content server.

11. The method of claim 6, wherein companion content correlated to the grid of time points over the essence of the media program is received, from the auxiliary content server, along with the time-based metadata; and wherein the companion content is encoded into the media data signal with the essence of the media program and the time-based metadata.

12. A method comprising:
receiving, from a media content server, essence of a media program, without receiving time-based metadata of a grid of time points over the essence of the media program from the media server;
generating, based on the essence of the media program, a set of query fingerprints;
encoding the essence of the media program and the set of query fingerprints into a media data signal, the second set of query fingerprints being transmitted in a specific metadata portion of the media data signal;
outputting the media data signal to one or more media devices.

13. A computer-implemented method comprising:
decoding a media data signal into essence of a media program and time-based metadata comprising a grid of time points over the essence of the media program, the time-based metadata being received in a specific metadata portion of the media data signal, the time-based metadata being generated by an upstream companion content creator system based on the essence of the media program, a reference clock and an essence-and-version identifier of the media program, the essence-and-version identifier being generated, based on program information about the essence of the media program;
receiving, from the specific metadata portion of the media data signal, one or more data items for a specific time point in the grid of time points that represents a specific location of the essence of the media program, the one or more data items identifying an auxiliary content server from which a specific companion content item linked to the specific time point is to be accessed;
based on resource location information in the one or more data items comprises, generating at least one universal resource locator in reference to the auxiliary content server;
wherein the method is performed by one or more computing devices.

14. The method of claim 13, further comprising:
receiving essence of a second media program and a set of query fingerprints generated based on the essence of the second media program, without receiving second time-based metadata of a second grid of time points over the essence of the second media program from the media server;
sending, to an auxiliary content server, one or more requests for the second time-based metadata and companion content correlated to the second grid of time points over the essence of the second media program, the one or more requests including the set of query fingerprints;
receiving, from the auxiliary content server, the second time-based metadata of the second grid of time points over the essence of the second media program in one or more responses to the one or more requests and the companion content correlated to the second grid of time points over the essence of the second media program.

15. The method of claim 13, further comprising:
receiving essence of a second media program, without receiving second time-based metadata of a second grid of time points over the essence of the second media program from the media server;

generating, based on the essence of the second media program, a set of query fingerprints;

sending, to an auxiliary content server, one or more requests for the second time-based metadata and companion content correlated to the second grid of time points over the essence of the second media program, the one or more requests including the set of query fingerprints;

receiving, from the auxiliary content server, the second time-based metadata of the second grid of time points over the essence of the second media program in one or more responses to the one or more requests and the companion content correlated to the second grid of time points over the essence of the second media program.

16. The method of claim 13, wherein the steps of decoding, receiving and generating are performed by a media device concurrently with rendering the essence of the media program with the media device.

17. The method of claim 16, further comprising displaying a user control to a user with the media device at the specific time point of the essence of the media program, the user control being selectable by the user to access the specific companion content item linked to the specific time point.

18. The method of claim 13, further comprising:
receiving user input representing a request for the specific companion content item linked to the specific time point at a media device;
accessing, based on the one or more data items, the specific companion content item linked to the specific time point.

19. A computer-implemented method comprising:
receiving and storing an essence-and-version identifier for essence of a media program, the essence-and-version identifier being generated based on program information about essence of a media program;
receiving and storing companion content correlated to a grid of time points over the essence of the media program, one or more companion content items in the companion content being linked to one or more time points in the grid of time points over the essence of the media program;
receiving, from a companion content client device, a companion content request with a companion content resource locator that is created based in part on at least one of the one or more time points in the grid of time points and the essence-and-version identifier for the essence of the media program;
in response to receiving the companion content request with the companion content resource locator, determining, based on the resource locator, at least one of the one or more companion content items in the companion content correlated to the grid of time points over the essence of the media program;
sending, to the companion content client device, the at least one of the one or more companion content items in the companion content correlated to the grid of time points over the essence of the media program as a response to the companion content request;
wherein the method is performed by one or more computing devices.

20. The method of claim 19, further comprising:
receiving, from a media encoding system, one or more requests for second time-based metadata of a second grid of time points over essence of a second media program, the one or more requests including a set of query fingerprints generated based on the essence of the second media program;
retrieving, based at least in part on the set of query fingerprints, the second time-based metadata;
sending, to the media encoding system, the second time-based metadata of the second grid of time points over the essence of the second media program in one or more responses to the one or more requests.

21. The method of claim 19, further comprising:
receiving, from the media device, one or more requests for second time-based metadata of a second grid of time points over essence of a second media program, the one or more requests including a set of query fingerprints generated based on the essence of the second media program;
retrieving, based at least in part on the set of query fingerprints, the second time-based metadata and second companion content annotated to the essence of the second media program;
sending, to the media device, the second time-based metadata of the second grid of time points over the essence of the second media program and the second companion content annotated to the essence of the second media program in one or more responses to the one or more requests.

22. A computer-implemented method comprising:
receiving, from a media encoding system, an essence-and-version identifier for essence of a media program, the essence-and-version identifier being generated based on program information about essence of a media program;
receiving, from the media encoding system, time-based metadata comprising a grid of time points over the essence of the media program and the set of reference fingerprints generated based on the essence of the media program;
receiving, from an annotated auxiliary content creator, a set of query fingerprints generated based on the essence of the media program;
in response to receiving the set of query fingerprints, sending, to the annotated auxiliary content creator, the time-based metadata comprising the grid of time points over the essence of the media program;
receiving and storing companion content annotated with the essence of the media program, one or more companion content items in the companion content being linked to one or more time points in a grid of time points over the essence of the media program;
receiving, from a companion content client device, a companion content request with a companion content resource locator that is created based in part on at least one of the one or more time points in the grid of time points and the essence-and-version identifier for the essence of the media program;
in response to receiving the companion content request with the companion content resource locator, determining, based on the resource locator, at least one of the one or more companion content items in the companion content annotated with the essence of the media program;
sending, to the companion content client device, the at least one of the one or more companion content items in the companion content annotated with the essence of the media program as a response to the companion content request;

wherein the method is performed by one or more computing devices.

23. A system comprising one or more computing processors configured to perform:
generating, based on program information about essence of a media program, an essence-and-version identifier for the essence of the media program;
based on the essence of the media program, a reference clock and the essence-and-version identifier, generating time-based metadata comprising a grid of time points over the essence of the media program;
correlating one or more cloud-based companion content items with one or more time points in the grid of time points over the essence of the media program by linking one or more companion content items in the companion content to one or more time points in the grid of time points over the essence of the media program;
causing the essence of the media program and the time-based metadata to be outputted to one or more recipient systems.

24. The system of claim 23, wherein the system is further configured to send the companion content to an auxiliary content server.

25. The system of claim 23, wherein the system is further configured to output the essence of the media program and the time-based metadata to one or more of broadcasters, streaming servers, media encoding systems, or media transcoding systems.

26. The system of claim 25, wherein the system is further configured to prevent the one or more companion content items in the companion content that are linked to the one or more time points in the grid of time points from being outputted to the one or more of broadcasters, streaming servers, media encoding systems, or media transcoding systems, with the essence of the media program and the time-based metadata.

27. The system of claim 25, wherein the system is further configured to output at least one of the one or more companion content items in the companion content that are linked to the one or more time points in the grid of time points to the one or more of broadcasters, streaming servers, media encoding systems, or media transcoding systems, with the essence of the media program and the time-based metadata.

28. A system comprising one or more computing processors configured to perform:
receiving, from a media content server, essence of a media program, without receiving time-based metadata of a grid of time points over the essence of the media program from the media content server;
generating, based on the essence of the media program, a set of query fingerprints;
sending, to an auxiliary content server, one or more requests for the time-based metadata, the one or more requests including the set of query fingerprints;
receiving, from the auxiliary content server, the time-based metadata of the grid of time points over the essence of the media program in one or more responses to the one or more requests;
encoding the essence of the media program and the time-based metadata comprising the grid of time points into a media data signal, the time-based metadata being transmitted in a specific metadata portion of the media data signal;
outputting the media data signal to one or more media devices.

29. A system comprising one or more computing processors configured to perform:
receiving, from a media content server, essence of a media program, without receiving time-based metadata of a grid of time points over the essence of the media program from the media server;
generating, based on the essence of the media program, a set of query fingerprints;
encoding the essence of the media program and the set of query fingerprints into a media data signal, the second set of query fingerprints being transmitted in a specific metadata portion of the media data signal;
outputting the media data signal to one or more media devices.

30. A system comprising one or more computing processors configured to perform:
receiving and storing an essence-and-version identifier for essence of a media program, the essence-and-version identifier being generated based on program information about essence of a media program;
receiving and storing companion content correlated to a grid of time points over the essence of the media program, one or more companion content items in the companion content being linked to one or more time points in the grid of time points over the essence of the media program;
receiving, from a companion content client device, a companion content request with a companion content resource locator that is created based in part on at least one of the one or more time points in the grid of time points and the essence-and-version identifier for the essence of the media program;
in response to receiving the companion content request with the companion content resource locator, determining, based on the resource locator, at least one of the one or more companion content items in the companion content correlated to the grid of time points over the essence of the media program;
sending, to the companion content client device, the at least one of the one or more companion content items in the companion content correlated to the grid of time points over the essence of the media program as a response to the companion content request.

31. A system comprising one or more computing processors configured to perform:
receiving, from a media encoding system, an essence-and-version identifier for essence of a media program, the essence-and-version identifier being generated based on program information about essence of a media program;
receiving, from the media encoding system, time-based metadata comprising a grid of time points over the essence of the media program and the set of reference fingerprints generated based on the essence of the media program;
receiving, from an annotated auxiliary content creator, a set of query fingerprints generated based on the essence of the media program;
in response to receiving the set of query fingerprints, sending, to the annotated auxiliary content creator, the time-based metadata comprising the grid of time points over the essence of the media program;
receiving and storing companion content annotated with the essence of the media program, one or more companion content items in the companion content being linked to one or more time points in a grid of time points over the essence of the media program;

receiving, from a companion content client device, a companion content request with a companion content resource locator that is created based in part on at least one of the one or more time points in the grid of time points and the essence-and-version identifier for the essence of the media program;

in response to receiving the companion content request with the companion content resource locator, determining, based on the resource locator, at least one of the one or more companion content items in the companion content annotated with the essence of the media program;

sending, to the companion content client device, the at least one of the one or more companion content items in the companion content annotated with the essence of the media program as a response to the companion content request.

\* \* \* \* \*